(12) United States Patent
Schmidt

(10) Patent No.: US 10,132,350 B2
(45) Date of Patent: Nov. 20, 2018

(54) BEARING ASSEMBLY AND EXHAUST GAS TURBOCHARGER

(71) Applicant: Schaeffler Technologies AG & Co. KG, Herzogenuarach (DE)

(72) Inventor: Heiko Schmidt, Muhlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/542,799

(22) PCT Filed: Jan. 15, 2016

(86) PCT No.: PCT/DE2016/200020
§ 371 (c)(1),
(2) Date: Jul. 11, 2017

(87) PCT Pub. No.: WO2016/116105
PCT Pub. Date: Jul. 28, 2016

(65) Prior Publication Data
US 2018/0003223 A1    Jan. 4, 2018

(30) Foreign Application Priority Data

Jan. 22, 2015 (DE) .................. 10 2015 200 971

(51) Int. Cl.
*F16C 25/08* (2006.01)
*F16C 27/04* (2006.01)
(Continued)

(52) U.S. Cl.
CPC .......... *F16C 25/083* (2013.01); *F16C 19/184* (2013.01); *F16C 27/045* (2013.01);
(Continued)

(58) Field of Classification Search
CPC .... F16C 19/182; F16C 19/184; F16C 25/083; F16C 27/045; F16C 33/583;
(Continued)

(56) References Cited

U.S. PATENT DOCUMENTS 4,652,219 A * 3/1987 McEachern, Jr. ........ F01D 25/16
384/518
4,721,441 A * 1/1988 Miyashita ............. F01D 25/164
384/518
(Continued)

FOREIGN PATENT DOCUMENTS

| DE | 3101596 | 8/1982 |
|---|---|---|
| DE | 3148191 | 6/1983 |

(Continued)

*Primary Examiner* — Marcus Charles
(74) *Attorney, Agent, or Firm* — Volpe and Koenig, P.C.

(57) ABSTRACT

A bearing assembly is disclosed for an exhaust gas turbocharger for rotatably supporting a rotor shaft on a bearing housing, having at least one bearing outer ring of a radial bearing, which at least one bearing outer ring is placed in a bearing bore of the bearing housing and consists of at least one part, and at least one securing element, which consists of at least one part and by which the bearing outer ring is axially fastened in relation to the bearing housing. In order to simplify the assembly of a corresponding bearing assembly and to reduce the production costs thereof, at least one circumferential groove, according to the invention, is arranged on an outer lateral surface of a compressor-side end section of the bearing outer ring, in which at least one groove the securing element engages, and the securing element is arranged outside of the bearing bore on the compressor side and is supported at least indirectly on a compressor-side end of the bearing housing.

13 Claims, 21 Drawing Sheets

(51) Int. Cl.
*F16C 19/18* (2006.01)
*F16C 33/58* (2006.01)
*F16C 35/077* (2006.01)
*F01D 25/16* (2006.01)
*F16C 33/66* (2006.01)
*F16C 35/067* (2006.01)

(52) U.S. Cl.
CPC .......... *F16C 33/583* (2013.01); *F16C 35/067* (2013.01); *F16C 35/077* (2013.01); *F01D 25/162* (2013.01); *F05D 2220/40* (2013.01); *F05D 2230/64* (2013.01); *F16C 33/6659* (2013.01); *F16C 33/6681* (2013.01); *F16C 2226/50* (2013.01); *F16C 2360/24* (2013.01)

(58) Field of Classification Search
CPC .............. F16C 33/6681; F16C 33/6659; F16C 35/067; F16C 35/077; F16C 2226/50; F16C 2226/80; F16C 2360/24; F04D 29/056; F05D 2220/40; F05D 2230/64; F01D 25/162
USPC ....... 384/474, 490, 504, 551, 564, 584–585, 384/906, 518–519, 561, 588, 903; 415/170.1, 174.1, 174.2, 229; 60/605.2, 60/605.3
See application file for complete search history.

(56) References Cited

U.S. PATENT DOCUMENTS

| | | | |
|---|---|---|---|
| 5,080,501 A | 1/1992 | Siebert et al. | |
| 5,253,985 A * | 10/1993 | Ruetz | F01D 25/164 384/473 |
| 6,877,901 B2 * | 4/2005 | Wollenweber | F01D 25/164 384/535 |
| 7,104,693 B2 * | 9/2006 | Mavrosakis | F01D 25/164 384/99 |
| 7,517,154 B2 * | 4/2009 | McKeirnan, Jr. | F01D 25/16 384/517 |
| 7,832,938 B2 * | 11/2010 | McKeirnan, Jr. | F16C 35/077 384/504 |
| 8,186,886 B2 * | 5/2012 | McKeirnan, Jr. | F01D 25/16 384/517 |
| 8,496,452 B2 * | 7/2013 | Marsal | F01D 25/162 384/906 |
| 8,740,465 B2 * | 6/2014 | McKeirnan, Jr. | F16C 19/163 384/517 |
| 8,888,447 B2 * | 11/2014 | House | F01D 25/16 415/177 |
| 8,939,650 B2 * | 1/2015 | Berruet | F16C 33/6659 384/475 |
| 9,068,473 B2 | 6/2015 | House et al. | |
| 9,212,698 B2 | 12/2015 | Schmidt | |
| 9,523,389 B2 | 12/2016 | Schmidt | |
| 9,581,044 B2 | 2/2017 | House et al. | |
| 2004/0200215 A1 * | 10/2004 | Woollenweber | F01D 15/10 60/407 |
| 2007/0183704 A1 * | 8/2007 | Umekawa | F01D 25/16 384/517 |
| 2012/0051906 A1 * | 3/2012 | House | F01D 25/16 415/229 |
| 2013/0202432 A1 * | 8/2013 | House | F01D 25/16 415/229 |
| 2013/0259416 A1 | 10/2013 | Schmidt | |
| 2014/0086731 A1 * | 3/2014 | Schmidt | F01D 25/125 415/170.1 |
| 2014/0369865 A1 * | 12/2014 | Marsal | F01D 25/16 417/406 |

FOREIGN PATENT DOCUMENTS

| | | | | |
|---|---|---|---|---|
| DE | 3628687 A1 * | 2/1988 | ........... | F01D 25/164 |
| DE | 112010001913 | 6/2012 | | |
| DE | 102011081200 A1 * | 2/2013 | ........... | F01D 25/18 |
| DE | 112011103128 | 8/2013 | | |
| DE | 102012206556 | 10/2013 | | |
| DE | 102012211891 | 1/2014 | | |
| EP | 2006561 | 12/2008 | | |
| EP | 3061942 A4 * | 10/2016 | ........... | F01D 25/16 |
| JP | 2006177550 | 7/2006 | | |
| WO | 2012079883 | 6/2012 | | |
| WO | WO-2013156194 A1 * | 10/2013 | ........... | F01D 25/125 |
| WO | WO-2014088824 A1 * | 6/2014 | ........... | F01D 25/162 |

* cited by examiner

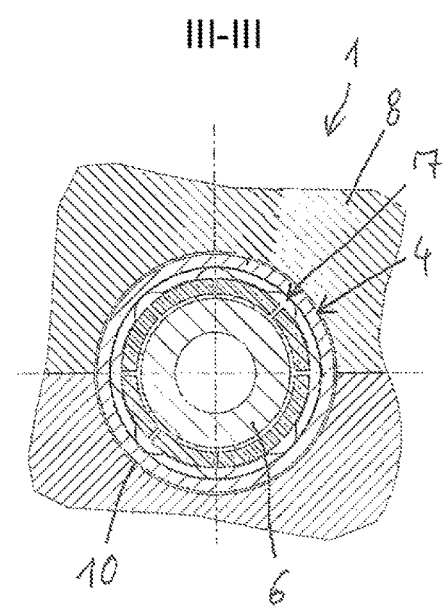
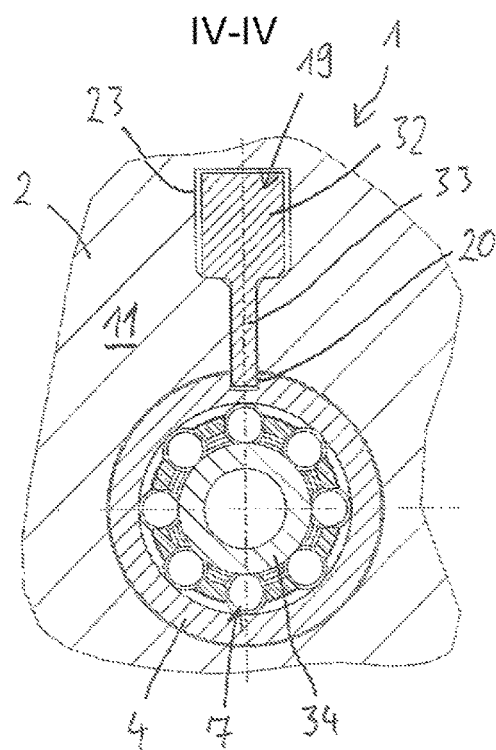
Fig. 7
Fig. 8

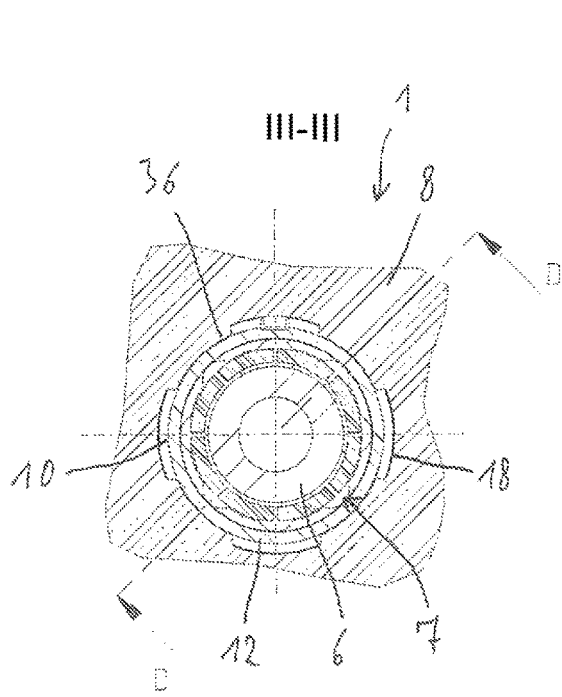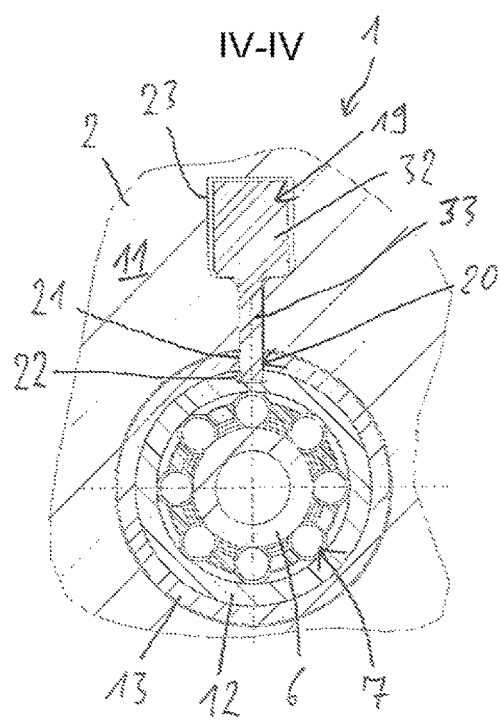
Fig. 11
Fig. 12

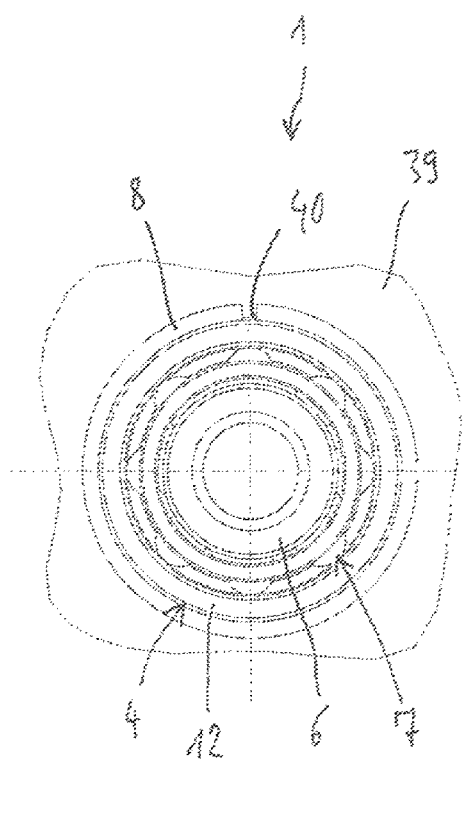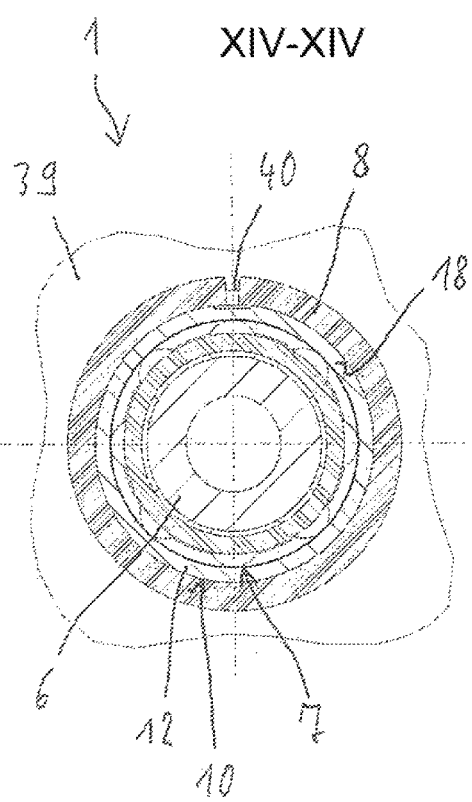
Fig. 22
Fig. 23

BEARING ASSEMBLY AND EXHAUST GAS TURBOCHARGER

CROSS REFERENCES TO RELATED APPLICATIONS

This application claims the benefit of PCT Application No. PCT/DE2016/200020, filed on Jan. 15, 2016, which claims the benefit of German Patent Application No. DE 102015200971.8, filed Jan. 22, 2015, the contents of which are incorporated by reference herein as if fully set forth.

FIELD OF THE INVENTION

Background

The invention relates to a bearing arrangement for an exhaust gas turbocharger for the rotating support of a rotor on a bearing housing, having at least one bearing outer ring that is constructed in two parts and is placed in a bearing hole of the bearing housing for a radial bearing and at least one securing element that is constructed at least in one part and by which the bearing outer ring is fixed axially relative to the bearing housing, wherein, on an outer lateral surface of a compressor-side end section of the bearing outer ring, at least one groove is arranged in which the securing element engages, wherein the securing element is arranged on the compressor side outside of the bearing hole and is supported at least indirectly on a compressor-side end of the bearing housing.

The invention also relates to an exhaust gas turbocharger with a corresponding bearing arrangement.

An exhaust gas turbocharger comprises a turbine wheel, a compressor wheel, and a rotor shaft connecting the turbine wheel to the compressor wheel in a rotationally locked manner. The rotor shaft is supported in a bearing housing of the exhaust gas turbocharger so that it can rotate via at least one radial roller bearing or radial sliding bearing.

DE 10 2012 211 891 A1 discloses a bearing arrangement for an exhaust gas turbocharger. The bearing arrangement comprises a bearing housing with a bearing hole in which a radial roller bearing is arranged that is constructed for holding radial and axial loads as two-row shoulder ball bearing or angled contact ball bearing. The radial roller bearing comprises a bearing outer ring constructed in one part and a bearing inner ring constructed in two parts and enclosed radially on the outside by the bearing outer ring and supported so that it can rotate on the bearing outer ring. The bearing arrangement also comprises a securing element constructed as a fixing disk by which the bearing outer ring is fixed axially relative to the bearing housing. The fixing disk is mounted on a compressor-side end of the bearing housing and axially adjacent to the bearing outer ring. The bearing outer ring is arranged completely within the bearing hole. On the turbine side, a radially inward pointing shoulder that is also used for the axial fixing of the bearing outer ring relative to the bearing housing connects to the bearing hole.

DE 11 2010 001 913 T5 shows a device securing a bearing arrangement against rotation. The bearing arrangement consists of a two-part inner ring and a one-part outer ring arranged in a bearing housing. On the outer circumference of the outer ring there is a groove that runs along the periphery and is inserted into a securing ring. A radial extent developed on the securing ring engages in a recess on the housing and in this way prevents a rotation of the outer ring in the circumferential direction.

An axial bearing with damping is the subject matter of DE 11 2011 103 128 T5. The bearing arrangement consists of a two-part inner ring and a one-part outer ring arranged in a bearing housing. On the outer extent of the outer ring there is a groove that runs along the periphery and in which a retaining ring is inserted. The retaining ring and a shoulder of the housing enclose a damping ring.

Another bearing arrangement is known from DE 10 2012 206 556 A1. Shown are a bearing arrangement for the support of a shaft of a turbocharger with a one-part bearing inner ring, a two-part bearing outer ring, wherein the bearing outer rings are tensioned against each other by a compression spring. The bearing outer rings are held by a carrier ring and put together to form a bearing cartridge that can be preassembled by securing rings.

SUMMARY

The objective of the invention is to simplify an assembly of an already mentioned bearing arrangement and to reduce its production costs.

This objective is achieved by the independent claims. Advantageous constructions are specified, in particular, in the dependent claims, which can present aspects of the invention by themselves or in different combinations with each other.

The bearing arrangement according to the invention for an exhaust gas turbocharger for the rotating support of a rotor shaft on a bearing housing comprises at least one bearing outer ring of a radial bearing constructed in two parts and placed in a bearing hole of the bearing housing and at least one securing element that is constructed in at least one part and by which the bearing outer ring is fixed axially relative to the bearing housing, wherein at least one surrounding groove is arranged on an outer lateral surface of a compressor-side end section of the bearing outer ring in which the securing element engages, wherein the securing element is arranged on the compressor side outside of the bearing hole and is supported at least indirectly on a compressor-side end of the bearing housing.

According to the invention, the bearing outer ring is fixed axially relative to the bearing housing by the securing element, which is arranged on the compressor side outside of the bearing hole and is supported at least indirectly on a compressor-side end of the bearing housing. Because the securing element arranged outside of the bearing hole engages in the groove arranged circumferentially on the outer lateral surface of the compressor-side end section of the bearing outer ring, the groove or a section of the bearing outer ring having the groove is consequently also arranged outside of the bearing hole. By engaging the securing element in the groove, at least the compressor-side end section of the bearing outer ring is fixed axially relative to the bearing housing such that the compressor-side end section cannot shift either axially in the direction of the turbine side or in the direction of the compressor side relative to the bearing housing, while possibly leaving play as compensation for thermal expansion. In particular, for a bearing outer ring constructed in one part, this arrangement does not require any other axial fixing of the bearing outer ring on the difficult-to-access turbine side. Thus, the assembly of a corresponding bearing arrangement according to the invention relative to the assembly of conventional bearing arrangements, in which an axial fixing must also be performed on the turbine side, is significantly simplified. This is due to the fact that the axial fixing of the bearing outer ring according to the invention can be easily realized exclusively on the easier-to-access compressor side.

The bearing arrangement according to the invention is suitable especially for the construction of an exhaust gas turbocharger. It can also be used, however, in other high rotational speed applications, for example, turbo compressors, turbo compound applications, superchargers, Super-Gen® systems, and the like.

The radial bearing can be constructed as radial roller bearings, especially two-row shoulder ball bearings or angled contact ball bearings. Alternatively, the radial bearing can be constructed as a radial sliding bearing. In the case of a two-row shoulder ball bearing or angled contact ball bearing, a bearing outer ring constructed in one part and a bearing inner ring constructed in two parts are provided. Alternatively, the two-row shoulder ball bearing or angled contact ball bearing can have a two-part bearing outer ring with axial outer ring parts pretensioned axially in opposite directions and a one-part bearing inner ring. In the latter case, the two-row shoulder ball bearing or angled contact ball bearing can be provided, instead of the bearing inner ring, with an integrated rotor shaft on whose outer lateral surface two raceways are arranged for the roller bodies of the two roller body rows.

The terms "axial" and "radial," as used in the present application, are defined by the geometry of the cylindrical bearing hole. The term "axial" consequently designates a direction parallel to the longitudinal middle axis of the bearing hole, while the term "radial" describes a direction running perpendicular to the longitudinal center axis of the bearing hole.

For conventional bearing arrangements, typically the bearing outer ring constructed in at least one part is fixed axially relative to the bearing housing at two axially different positions, as can be seen, for example, in DE 10 2012 211 891 A1. Especially for bearing arrangements with a bearing outer ring constructed in two parts, whose outer ring parts are pretensioned in axially opposite directions by a compression spring, it must be ensured that axial shaft forces are not transmitted via the compression spring, but instead directly via the bearing outer ring or its outer ring parts or, for example, by an optionally present intermediate ring on the bearing housing. If the axial shaft force was transmitted via the compression spring to the bearing housing, the compression spring for the axial shaft force would have to counteract a force that is greater than or equal to the axial shaft force. This force of the compression spring would also necessarily act in a state loaded axially not by the rotor shaft and would thus cause increased bearing friction. To avoid this, conventionally a considerable effort is spent in the construction of the bearing arrangement.

To guarantee the assembly of a two-row shoulder ball bearing or angled contact ball bearing, at least one of the bearing inner ring or the bearing outer ring must have a two-part construction. In order to ensure, for a two-row shoulder ball bearing or angled contact ball bearing with two-part bearing outer ring whose outer ring parts are pretensioned by a compression spring in the axially opposite directions, the direct support of the axial shaft force on the bearing housing described above, conventionally an intermediate ring or a bolt can be used or securing rings, for example, snap rings, can be used. If both outer ring parts of the bearing outer ring are supported directly on such an intermediate ring, the bearing inner ring must also have a two-part construction and transport protection devices are also required. On the other hand, intermediate-ring-fixed pins that hold the outer ring parts of a bearing outer ring in position in a positive-locking connection, require precise manufacturing of the pin and the associated hole. Housing-fixed pins that extend radially from the bearing housing between two outer ring parts of a bearing outer ring likewise require precise manufacturing, especially also the associated hole position that can be realized only within production-dependent limits and cause high costs accordingly. In addition, for the use of housing-fixed pins through an axial shaft force and the lever arm at the support point of each outer ring part, a non-favorable tilting moment is introduced into the respective outer ring part, which could increase the bearing friction and negatively affect the functionality of the bearing arrangement. Furthermore, snap rings that are conventionally arranged in the bearing center are very difficult to access and thus their installation is difficult or impossible.

All of these disadvantages can be avoided by the use of a bearing arrangement according to the invention, which makes it possible to transmit an axial shaft force at an easily accessible position, namely outside of the bearing hole on the compressor side, via the securing element from the bearing outer ring to the bearing housing. In addition, the bearing arrangement according to the invention can be realized without a conventional intermediate ring and therefore especially with only one split bearing ring (bearing inner ring or bearing outer ring), which is associated with a reduction of components and production costs. In addition, for the bearing arrangement according to the invention, the pin mentioned above can be eliminated, so that negative effects associated with it on the bearing functions of the bearing arrangement can be avoided. Overall, the bearing arrangement according to the invention can be assembled much more easily and can be produced more economically.

Another advantage of the invention is that oil, which is forced by the engine oil pressure, among other things, by a squeezed oil film formed between the bearing outer ring and the bearing housing in the axial direction toward the compressor-side end of the bearing arrangement, can leave the bearing area only via the gap extending across the entire circumference between the securing element and bearing outer ring. Here, the oil flow is better throttled through the bearing arrangement, which is associated with a reduction of the oil consumption. In the wobbling motion of the bearing outer ring caused by a rotor shaft imbalance when the bearing arrangement is in use, oil is also pressed into the wandering gap between the securing element and bearing outer ring, whereby excellent axial mechanical damping is always provided with specified low oil consumption.

The bearing arrangement according to the invention also has improved axial positional accuracy compared with conventional bearing arrangements, because only one reference is defined by the compressor-side end of the bearing housing on which the securing element contacts directly or indirectly.

The bearing arrangement has a two-part construction and a compressor-side outer ring part and a turbine-side outer ring part, wherein the compressor-side end section of the bearing outer ring is arranged on the compressor-side outer ring part, wherein the outer ring parts are guided so that they can move axially in each other and are pretensioned by at least one intermediate compression spring in axially opposite directions.

Here, the radial wheel bearing can be constructed as a two-row angled shoulder bearing or angled contact ball bearing with two-part bearing outer ring, whose outer ring parts are pretensioned by the compression spring in axially opposite directions. The radial bearing can also have a bearing inner ring constructed in one part. Alternatively, the inner raceways for the roller bodies of the two roller body rows can be arranged, instead of on a bearing inner ring, directly on the rotor shaft; the bearing arrangement thus can have an integrated rotor shaft.

Because the outer ring parts are guided so that they can move axially one in the other, one outer ring part takes over the guidance of the other outer ring part guided so that it can move axially in the first outer ring part, for example, by a tight clearance fit. Preferably, the compressor-side outer ring part is guided axially so that it can move in the turbine-side outer ring part. For conventional spring-tensioned outer ring parts, the outer ring parts are arranged, in contrast, axially apart from each other. Therefore, conventionally, the outer ring parts must each be provided with their own axial support. In addition, conventionally for the bearing arrangements loaded with play, as described above, a shoulder with reduced diameter must be precisely manufactured as the end stop on the turbine side in the bearing housing, as is known, for example, from DE 10 2012 211 891 A1. In a bearing arrangement according to the present construction, this axial support of the outer ring parts can be performed on the bearing housing in a simple way just on the easily accessible compressor side. No additional grooves or shoulders that must be manufactured with precision have to be formed on the shoulders on the bearing housing.

The turbine-side outer ring part can contact the securing element on the turbine side on the outside in the axial direction. The groove on the outer lateral surface of the compressor-side outer ring part can be positioned and dimensioned such that the compressor-side outer ring part is supported for an axial shaft force in the direction of the turbine side on the compressor side on the securing element and the turbine-side outer ring part for an axial shaft force in the direction of the compressor side on the turbine side on the securing element. In the nominal position, when there is no axial shaft force, the outer ring parts can have play with respect to the securing element, so that temperature-dependent length change of the outer ring parts can be compensated, without the bearing arrangement engaging in geometric pretensioning.

The bearing arrangement also has, relative to conventional bearing arrangements, an improved axial position accuracy, because a single reference is defined by the compressor-side end of the bearing housing on which the securing element can contact directly, wherein the support position of the turbine-side outer ring part is defined exactly and the support position of the compressor-side outer ring part is influenced only by the thickness tolerance of the securing element that can be set exactly, for example, by favorable height grinding. The manufacturing costs of the turbine-side outer ring part can be reduced if the fine processing of the turbine-side outer ring part is limited to the guide area for the compressor-side outer ring part. In this guide area of the turbine-side outer ring part, a ground area can be easily run down or a recess can be turned. Care must be taken that the axial length of the guide area enables an "over-compression" of the compression spring for the installation of the bearing arrangement, wherein the over-compression of the compression spring is performed for introducing the roller body between the bearing outer ring constructed in two parts and the bearing inner ring constructed in at least one part or the integrated rotor shaft.

Advantageously, the compression spring is supported on one side on a turbine-side end surface of the compressor-side outer ring part and on the other side on at least one radially inward pointing projection arranged on an inner lateral surface of the turbine-side outer ring part, wherein the projection is formed by a circumferential radial step on an inner lateral surface of the turbine-side outer ring part. The compressor-side outer ring part is guided according to this arrangement axially so that it can move in the turbine-side outer ring part. In this way, relative to conventional bearing arrangements, a greater distance between spring support surfaces can be realized, which has a positive effect on the design of the compression spring. The compression spring is guided on its outer circumference by the inner diameter of the turbine-side outer ring part and thus has little radial clearance. Therefore, and due to the damping effect of the oil located in the surroundings of the compression spring, the requirements with respect to the radial spring stiffness of the compression spring are low and the risk of uncontrolled oscillations of the compression spring are reduced. Thus, for example, a more economical, conventional helical spring made from round wire can be used as the compression spring, wherein costs can be reduced relative to the conventional use of sinuous springs.

According to another advantageous construction, the bearing arrangement comprises at least one anti-rotation element for securing the bearing outer ring against rotation relative to the bearing housing, wherein the anti-rotation element engages radially in at least one recess constructed on the bearing outer ring. In the case of a two-part bearing outer ring corresponding to the previously mentioned construction, advantageously both outer ring parts are secured by the anti-rotation element against rotation relative to the bearing housing, wherein the recess of the bearing outer ring is divided on the two outer ring parts. The anti-rotation element can be constructed, for example, as a radially directed pin that engages radially in the recess of the bearing outer ring. The anti-rotation element can have nominally sufficient play relative to the bearing outer ring or its outer ring parts, so that the bearing outer ring or its outer ring parts is or are not prevented from moving in the squeeze oil film at all the possible operating temperatures. The bearing arrangement can also have two or more corresponding anti-rotation elements arranged, in particular, uniformly offset relative to each other circumferentially.

It is advantageous if the anti-rotation element is mounted on the compressor-side end of the bearing housing, wherein, on the compressor-side end of the bearing housing, a relief is arranged in which a section of the anti-rotation element is housed, wherein the anti-rotation element is mounted by the securing element and/or by a separate attachment on the compressor-side end of the bearing housing. The section of the anti-rotation element can be sunk partially or completely in the relief on the compressor-side end of the bearing housing or can close flush with the compressor-side end of the bearing housing. The securing element can be dimensioned radially such that it covers the relief on the compressor-side end of the bearing housing, wherein the anti-rotation element can be mounted on the bearing housing. Here, the securing element can have a plate-shaped or disk-shaped construction and can be screwed together with the bearing housing. Alternatively or additionally, the anti-rotation element or its section arranged in the relief can be mounted by the separate attachment, for example, at least one threaded connection, on the bearing housing. Between the relief and the section of the anti-rotation element arranged therein, there can be play in order to be able to absorb different thermal expansion of components of the bearing arrangement or to avoid the buildup of mechanical stress in the components.

As an alternative to an arrangement of an anti-rotation element on the compressor-side end of the bearing housing, however, this can also be provided within the bearing hole between two parts of a divided bearing outer ring. Here, this anti-rotation element can be housed in corresponding recesses, on one side, in the bearing housing and, on the other side, in the bearing outer ring.

According to another advantageous construction, the securing element is constructed as a plate with at least two parts and with at least one cut-out, wherein a radial extent of the plate is larger than a diameter of the bearing hole, and wherein a diameter of the cut-out is smaller than an outer diameter of the compressor-side end section of the bearing outer ring. The plate can be formed, for example, from sheet metal. The plate can be arranged perpendicular to the longitudinal middle axis of the bearing hole and can be mounted fixed to the bearing housing. The cut-out can have a circular or polygonal cross section and can be arranged coaxial to the longitudinal middle axis of the bearing hole. The two parts of the plate can be introduced in opposite directions radially into the groove on the outer lateral surface of the compressor-side end section of the bearing outer ring constructed in one part or the compressor-side outer ring part of the bearing outer ring constructed in two parts. The cut-out of the securing element should be dimensioned radially so large that the radial movement of the bearing outer ring constructed in one part or the compressor-side outer ring part of the bearing outer ring constructed in two parts is not restricted by the securing element. The securing element can be produced by a fracture separating process with which the two plate parts of the securing element are formed from a one-part plate.

Another advantageous construction provides that the securing element is constructed as a one-part plate with at least one cut-out, wherein a radial extent of the plate is larger than a diameter of the bearing hole, wherein a diameter of the cut-out is greater than an outer diameter of the compressor-side end section of the bearing outer ring, wherein the plate has at least two ridges arranged offset circumferentially relative to each other and projecting radially inward into the cut-out, wherein at least two reliefs arranged offset circumferentially relative to each other corresponding to the ridges are provided on a compressor-side end area of the bearing outer ring following the groove. The plate can be formed, for example, from sheet metal. The plate can be arranged perpendicular to the longitudinal middle axis of the bearing hole and mounted fixed on the bearing housing. The cut-out can have a circular or polygonal cross section and can be arranged coaxial to the longitudinal middle axis of the bearing hole. The radial distance between the ridges of the securing element should be large enough that the radial movement of the bearing outer ring constructed in one part or the compressor-side outer ring part of the bearing outer ring constructed in two parts is not limited by the securing element. For the assembly, the ridges of the securing element and the reliefs of the bearing outer ring constructed in one part or the compressor-side outer ring part of the bearing outer ring constructed in two parts can be oriented essentially congruently. Then the securing element and the bearing outer ring or compressor-side outer ring part can be moved to each other until the ridges have been guided through the reliefs and are located in the groove. Then the securing element and/or the bearing outer ring or compressor-side outer ring can be rotated about the longitudinal middle axis of the bearing outer ring or compressor-side outer ring part until the ridges of the securing element are arranged essentially congruently with ridges of the bearing outer ring arranged between the reliefs or compressor-side outer ring part, wherein axial shaft forces can be introduced into the bearing housing by the securing element in the operation of the bearing arrangement. Here, axial shaft forces can be transmitted in the area of the groove in the direction of the compressor side over the entire surface and in the direction of the turbine side over the ridges of the bearing outer ring arranged between the reliefs or compressor-side outer ring part over part of the surface. The securing element can also have three, four, or more ridges arranged offset uniformly relative to each other, wherein the compressor-side end area of the bearing outer ring following the groove or compressor-side outer ring part is to be provided with a corresponding number of reliefs arranged accordingly. Part of the securing element is not required in this construction, which simplifies the manufacturing and assembly work and also reduces costs.

According to another advantageous construction, the securing element is constructed as a securing ring, wherein the securing ring is supported by a securing plate constructed in one part indirectly on the compressor-side end of the bearing housing, and wherein the securing plate is connected by the securing ring to the bearing outer ring. The securing plate can be formed, for example, from sheet metal. The securing plate can be arranged perpendicular to the longitudinal middle axis of the bearing hole and can be mounted fixed on the bearing housing. The securing plate preferably comprises a cut-out through which a part of the bearing outer ring can be guided. The cut-out can have a circular or polygonal cross section and can be arranged coaxial to the longitudinal middle axis of the bearing hole. The cut-out is dimensioned radially larger than an outer diameter of the compressor-side end section such that the securing plate can be pushed over the compressor-side end section. The cut-out of the securing plate shall be dimensioned radially large enough that the radial movement of the bearing outer ring constructed in one part or the compressor-side outer ring part of the bearing outer ring constructed in two parts is not limited by the securing plate. In comparison to the last-mentioned construction, no reliefs are present on the bearing outer ring or compressor-side outer ring part, so that axial shaft forces in the area of the groove on the outer lateral surface of the compressor-side end section can also be transmitted in the direction of the turbine side over the entire surface onto the securing element. The turbine-side outer ring part of a bearing outer ring constructed in two parts can be supported over its entire surface on the turbine side on the one-part securing plate. The bearing outer ring constructed in one part or the compressor-side outer ring part of the bearing outer ring constructed in two parts is supported on the securing plate by the securing ring that engages in the groove on the bearing outer ring or compressor-side outer ring part. Thus, the advantages of the full-surface support of the bearing outer ring are combined with the advantages of using a one-part securing plate.

It is also advantageous if a compressor-side side wall of the groove forms a cone tapering in the direction of a turbine-side side wall of the groove. This has the result that a securing ring engaging in the groove is pressed against the turbine-side, in particular, radial side wall of the groove. In this way, the position of the bearing outer ring or compressor-side outer ring part and thus the formed radial bearing is defined with the effect of an axial shaft force in the direction of the turbine side exactly and without the influence of the thickness tolerance of the securing ring.

The exhaust gas turbocharger according to the invention has at least one bearing arrangement according to one of the previously mentioned constructions or an arbitrary combination of these. The advantages specified above with reference to the bearing arrangement are associated with the exhaust gas turbocharger accordingly. The bearing housing of the bearing arrangement is also designated as the central housing of the exhaust gas turbocharger.

The invention is not limited to the specified combination of features of independent claims and the dependent claims. It is also possible to combine individual features with each other, especially if they are produced from the claims, the following description of the embodiments, or directly from the figures. In addition, references in the claims to the figures by the use of reference symbols shall in no may restrict the scope of protection of the claims to the illustrated embodiments.

BRIEF DESCRIPTION OF THE DRAWINGS

Preferred embodiments of the invention are explained in more detail below using the accompanying drawings. These show.

DETAILED DESCRIPTION

In the figures, functionally identical components are provided with the same reference symbols.

Figure 1:
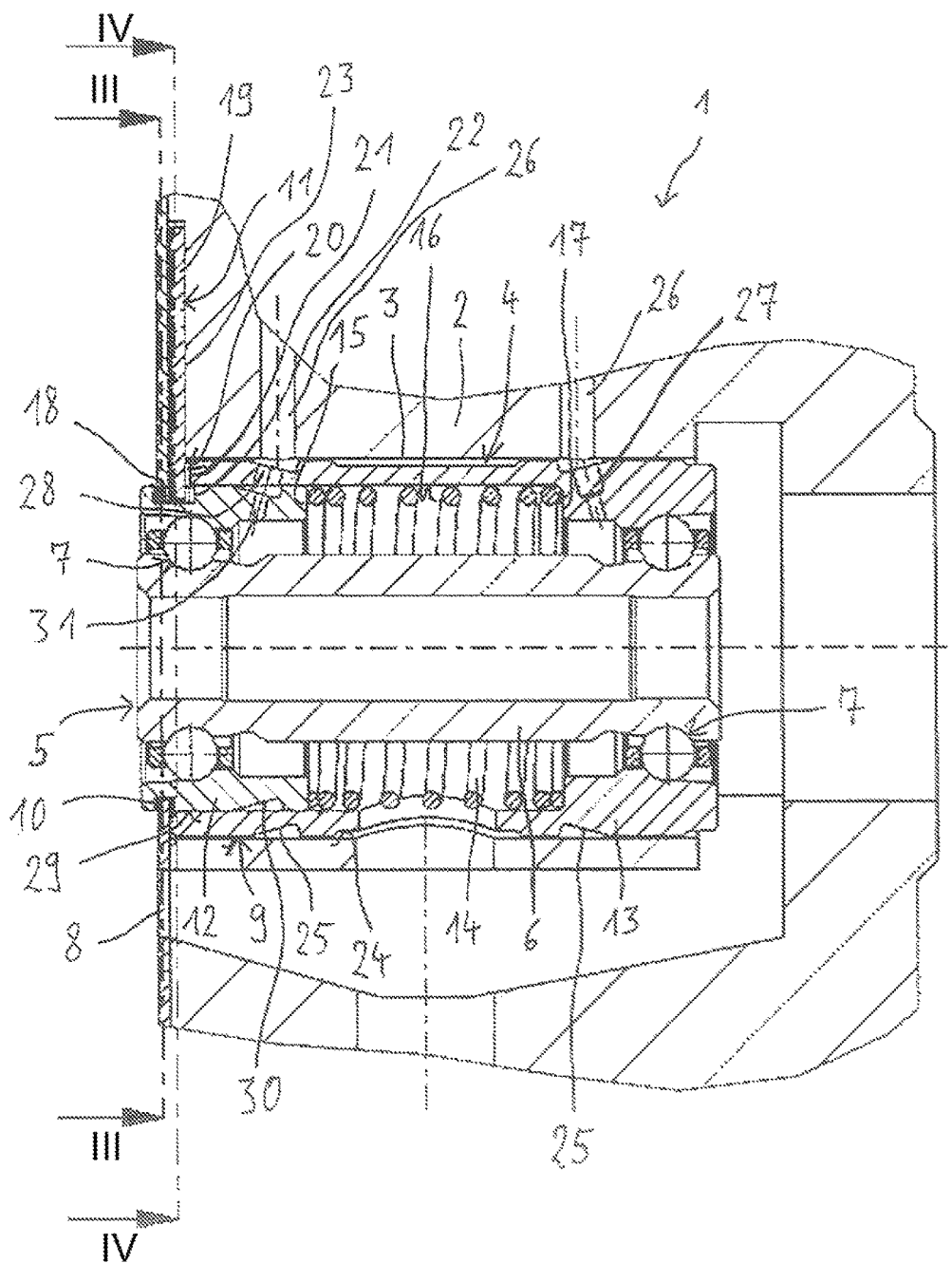
FIG. 1 a schematic illustration of a longitudinal section of an embodiment for the bearing arrangement according to the invention, FIG. 2 a schematic detail illustration of the bearing arrangement shown in FIG. 1, FIG. 3 a schematic illustration of a cross section along III-III of the bearing arrangement shown in FIG. 1, FIG. 4 a schematic illustration of another cross section along IV-IV of the bearing arrangement shown in FIG. 1, FIG. 5 a schematic illustration of a longitudinal section of an embodiment for a bearing arrangement not part of the invention, FIG. 6 a schematic detail illustration of the bearing arrangement shown in FIG. 5 that is not part of the invention, FIG. 7 a schematic illustration of a cross section of the bearing arrangement shown in FIG. 5, FIG. 8 a schematic illustration of another cross section of the bearing arrangement shown in FIG. 5, FIG. 9 a schematic illustration of a longitudinal section of another embodiment for a bearing arrangement according to the invention, FIG. 10 a schematic end view of the bearing arrangement shown in FIG. 9, FIG. 11 a schematic illustration of a cross section of the bearing arrangement shown in FIG. 9, FIG. 12 a schematic illustration of another cross section of the bearing arrangement shown in FIG. 9 along XIV-XIV of FIG. 11, FIG. 13 a schematic detail illustration of the bearing arrangement shown in FIG. 9, FIG. 14 another schematic detail illustration of the bearing arrangement shown in FIG. 9, FIG. 15 a schematic and perspective illustration of three successive assembly states of the bearing arrangement shown in FIG. 9, FIG. 16 a schematic illustration of a longitudinal section of another embodiment for a bearing arrangement that is not part of the invention, FIG. 17 a schematic end view of the bearing arrangement shown in FIG. 16, FIG. 18 a schematic illustration of a cross section of the bearing arrangement shown in FIG. 16, FIG. 19 a schematic illustration of another cross section of the bearing arrangement shown in FIG. 16, FIG. 20 a schematic illustration of a longitudinal section of another embodiment for a bearing arrangement according to the invention, FIG. 21 a schematic detail illustration of the bearing arrangement shown in FIG. 20, FIG. 22 a schematic end view of the bearing arrangement shown in FIG. 20, FIG. 23 a schematic illustration of a cross section of the bearing arrangement shown in FIG. 20, FIG. 24 a schematic illustration of another cross section of the bearing arrangement shown in FIG. 20, FIG. 25 a schematic illustration of another cross section of the bearing arrangement shown in FIG. 20, and FIG. 26 a schematic detail illustration of a longitudinal section of another embodiment for a bearing arrangement according to the invention.

FIG. 1 shows a schematic representation of a longitudinal section of an embodiment for a bearing arrangement 1 according to the invention for an exhaust gas turbocharger not shown further for the rotating support of a not-shown rotor shaft on a bearing housing 2.

The bearing arrangement 1 comprises a bearing outer ring 4 constructed in two parts and placed in a bearing hole 3 of the bearing housing 2 in a radial bearing 5 in the form of a two-row shoulder ball bearing or angular contact ball bearing. The radial bearing 5 also comprises a bearing inner ring 6 that is constructed in one part and is supported so that it can rotate in the bearing outer ring 4 by two roller body rows 7. This rotating support is known, therefore will not be discussed in detail here.

In addition, the bearing arrangement 1 comprises a securing element 8 that is constructed in two parts and by which the bearing outer ring 4 is fixed axially relative to the bearing housing 2. On an outer lateral surface 9 of a compressor-side end section of the bearing outer ring 4 there is a surrounding groove 10 in which the securing element 8 engages. The securing element 8 is arranged on the compressor side outside of the bearing hole 3 and is supported at least indirectly on a compressor-side end 11 of the bearing housing 2.

The bearing outer ring 4 comprises a compressor-side outer ring part 12 and a turbine-side outer ring part 13, wherein the compressor-side end section of the bearing outer ring 4 is arranged on the compressor-side outer ring part 12. The compressor-side outer ring part 12 is guided so that it can move axially in the turbine-side outer ring part 13.

The outer ring parts 12 and 13 are pretensioned by an intermediate compression spring 14 in axially opposite directions. The compression spring 14 is supported on one side on a turbine-side end 15 of the compressor-side outer ring part 12 and on the other side on a projection 17 that is arranged on an inner lateral surface 16 of the turbine-side outer ring part 13 and pointing radially inward and is constructed by a surrounding radial step on the inner lateral surface 16 of the turbine-side outer ring part 13.

Figure 3:
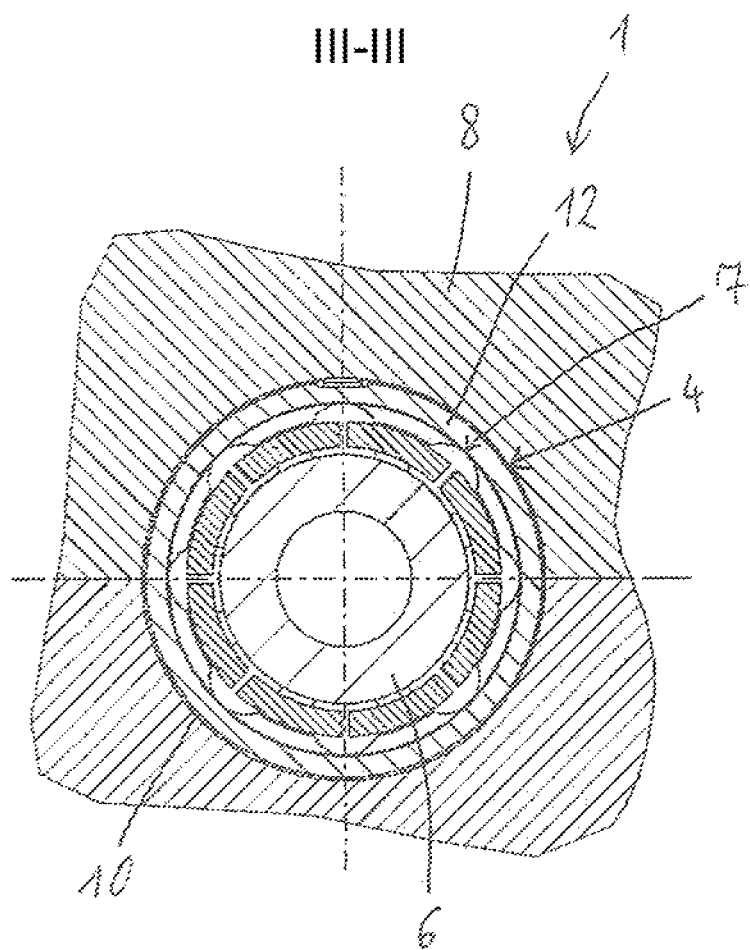

The securing element 8 is constructed as a two-part plate with a cut-out 18, which can be seen better in FIG. 3, wherein a radial extent of the plate is greater than a diameter of the bearing hole 3 and a diameter of the cut-out 18 is smaller than an outer diameter of the compressor-side end section of the bearing outer ring 4 or the compressor-side outer ring part 12.

The bearing arrangement 1 also comprises an anti-rotation element 19 for securing the bearing outer ring 4 or the compressor-side outer ring part 12 against rotation relative to the bearing housing 2. The anti-rotation element 19 is mounted on the compressor-side end 11 of the bearing housing 2 and here engages radially in a recess 20 formed on the bearing outer ring 4 or compressor-side outer ring part 12. The recess 20 is formed by a relief 21 on the turbine-side outer ring part 13 and a recess 22 on the compressor-side outer ring part 12, which can be seen better in FIG. 4. On the compressor-side end 11 of the bearing housing 2 there is a relief 23 in which a section of the anti-rotation element 19 is enclosed. The anti-rotation element 19 is mounted by the securing element 8 that covers the relief 23 and/or by a separate, not-shown attachment on the compressor-side end 11 of the bearing housing 2.

On an outer lateral surface 24 of the turbine-side bearing outer ring 13 there are two circumferential grooves 25 that are connected in a fluid-communicating manner to two oil supply holes 26 in the bearing housing 2. A spray oil hole 27 connects to the turbine-side groove 25. A spray oil hole section 28 connects to the compressor-side groove 25.

On an outer lateral surface 29 of the compressor-side outer ring part 12 there is a circumferential groove 30 that is connected by the spray oil hole section 28 and the compressor-side groove 25 of the turbine-side outer ring part 12 in communication with the compressor-side oil supply hole 26. Another spray oil hole section 31 connects to the groove 30.

Figure 2:
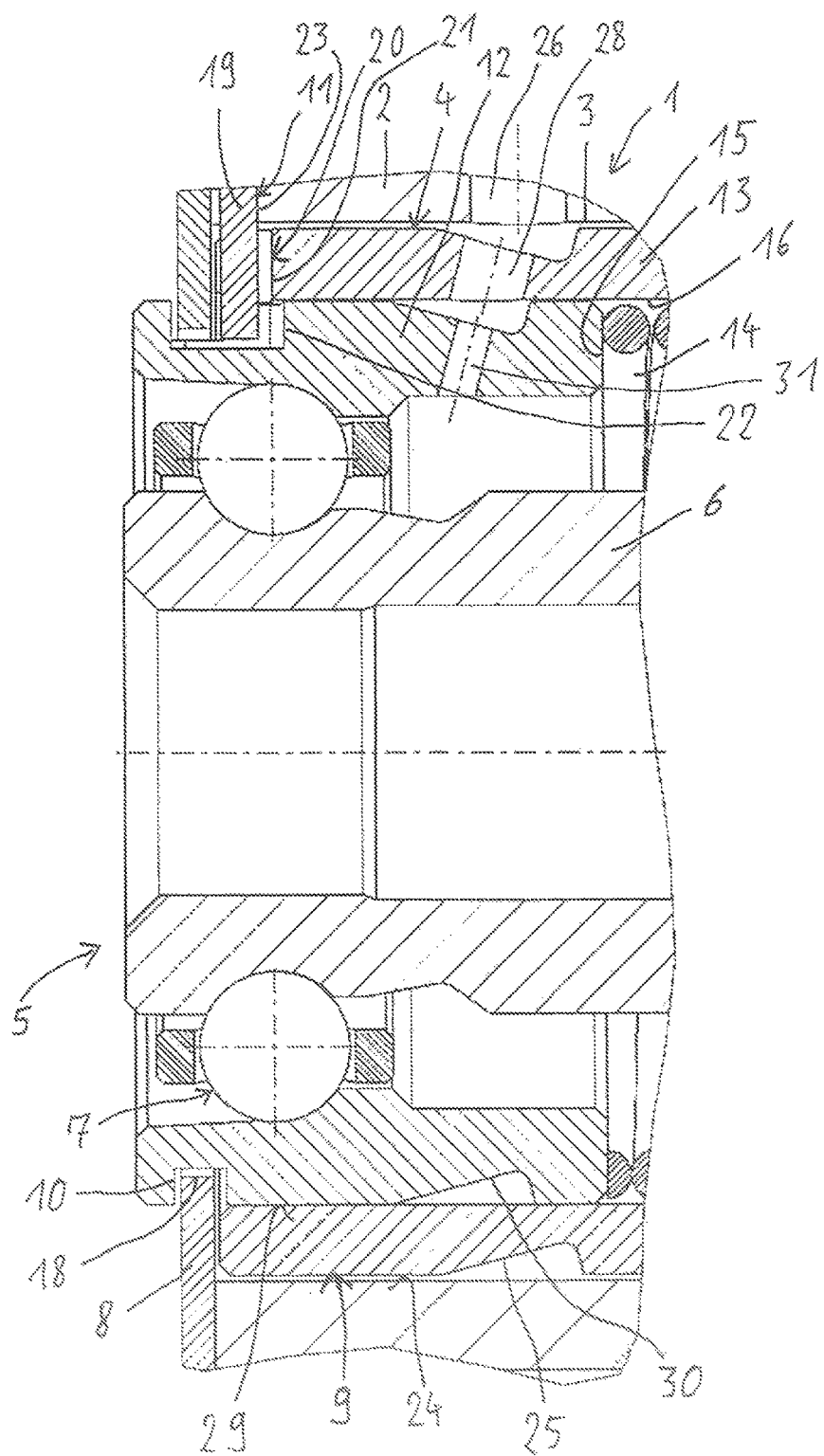

FIG. 2 shows a schematic detail representation of the bearing arrangement 1 shown in FIG. 1. The compressor-side structure of the bearing arrangement 1 can be seen better here.

FIG. 3 shows a schematic representation of a cross section of the bearing arrangement 1 shown in FIG. 1 corresponding to the section plane III-III from FIG. 1, that is, in the area of the groove 10 of the compressor-side outer ring part 12.

Figure 4:
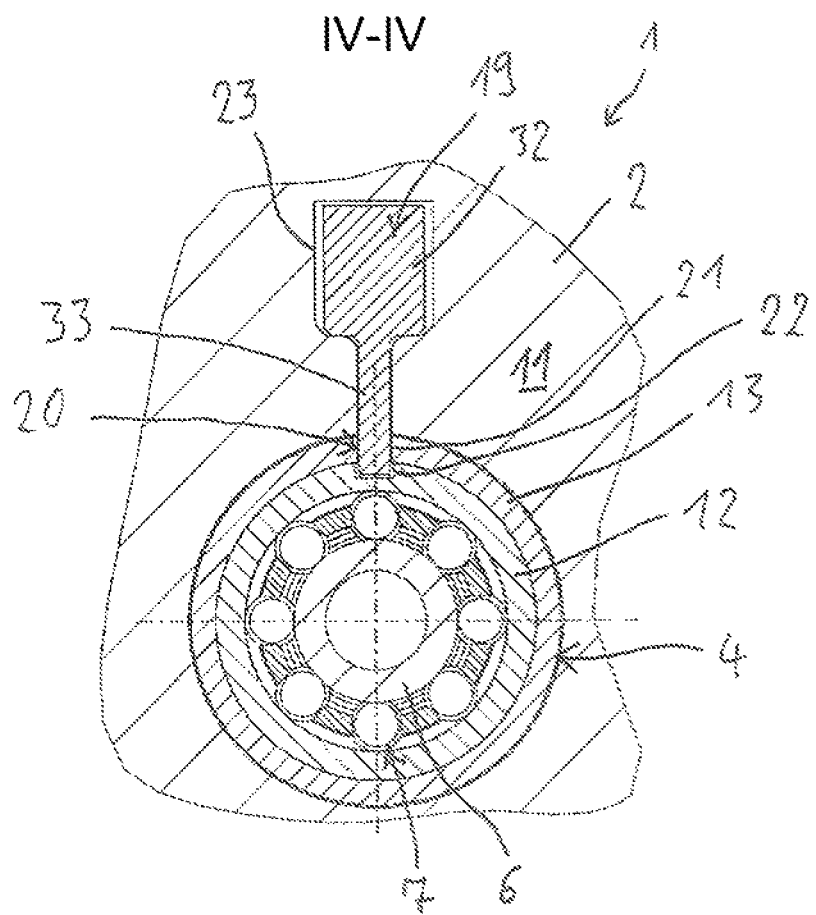

FIG. 4 shows a schematic representation of another cross section of the bearing arrangement 1 shown in FIG. 1 corresponding to the section plane Iv-Iv from FIG. 1, that is, in the area of the anti-rotation element 19. The anti-rotation element 19 comprises a section 32 in the relief 23 and a section 33 projecting radially inward from the first section, wherein the section 32 is larger than the section 33. The section 33 engages radially in the recess 20 of the bearing outer ring 4 that is formed by the relief 21 on the turbine-side outer ring part 13 and the recess 22 on the compressor-side outer ring part 12.

Figure 5:
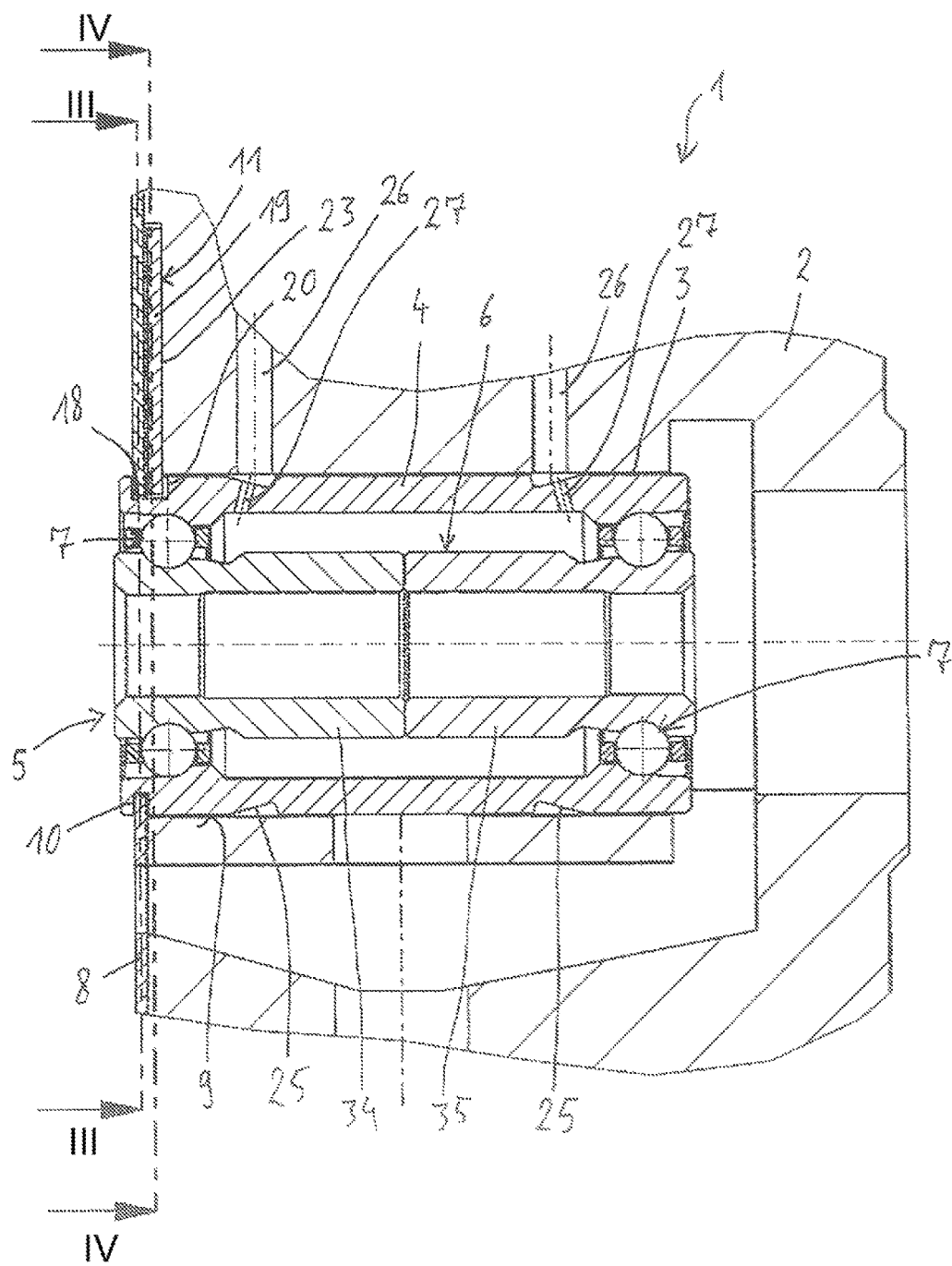

FIG. 5 shows a schematic representation of a longitudinal section of another embodiment for a bearing arrangement 1 according to the invention. Below, only the differences to the embodiment shown in FIG. 1 are explained. With respect to the common features between the embodiments, refer to the statements concerning FIGS. 1 to 4.

The essential difference between the embodiment shown in FIGS. 1 to 4 and the embodiment shown in FIG. 5 and not part of the invention is that the bearing outer ring 4 has a one-part construction, while the bearing inner ring 6 has a two-part construction and two inner ring parts 34 and 35 and that there is no compression spring 14. On the bearing outer ring 4 there are two complete spray oil holes 27 that are each connected in a fluid-communicating way to one of the grooves 25 arranged on the outer lateral surface 9 of the bearing outer ring 4. Incidentally, the embodiment shown in FIG. 5 matches the embodiment shown in FIGS. 1 to 4.

Figure 6:
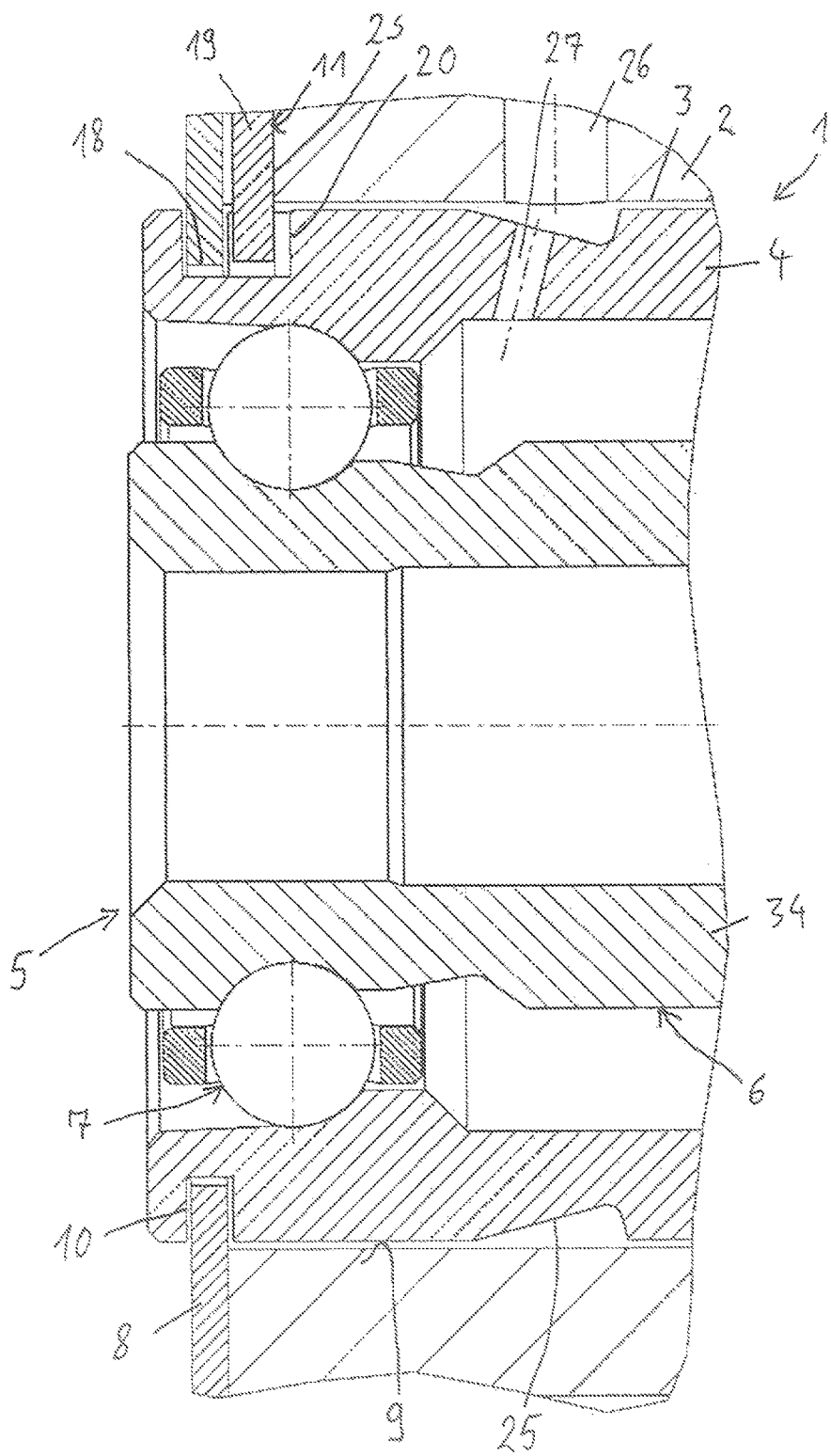

FIG. 6 shows a schematic detail representation of the bearing arrangement 1 shown in FIG. 5 and not part of the invention. The compressor-side structure of the bearing arrangement 1 can be seen better here.

FIG. 7 shows a schematic representation of a cross section of the bearing arrangement 1 shown in FIG. 5 corresponding to the section plate III-III from FIG. 5, that is, in the area of the groove 10 of the bearing outer ring 4.

FIG. 8 shows a schematic representation of another cross section of the bearing arrangement 1 shown in FIG. 5 corresponding to the section plane Iv-Iv from FIG. 5, that is, in the area of the anti-rotation element 19. The section 33 of the anti-rotation element 19 engages radially in the recess 20 of the bearing outer ring 4.

Figure 9:
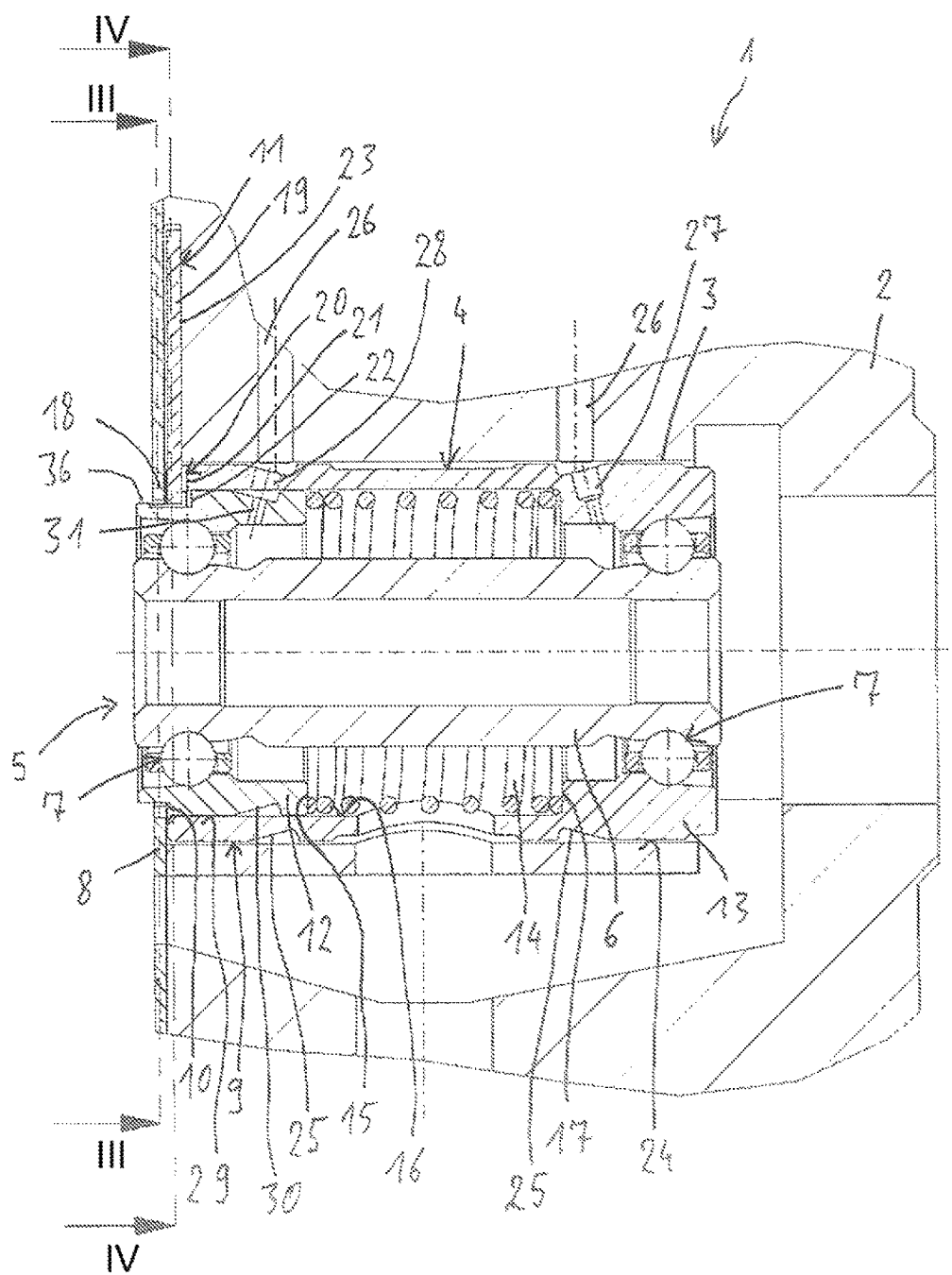

FIG. 9 shows a schematic representation of a longitudinal section of another embodiment for a bearing arrangement 1 according to the invention. Below, only the differences to the embodiment shown in FIG. 1 will be explained. With respect to the common features between the embodiments, refer to the statements concerning FIG. 1.

The securing element 8 is constructed as a one-part plate with a cut-out 18, wherein a radial extent of the plate is greater than a diameter of the bearing hole 3. A diameter of the cut-out 18 is greater than an outer diameter of the compressor-side end section of the bearing outer ring 4 or the compressor-side outer ring part 12. The plate comprises four ridges 36 arranged offset uniformly relative to each other circumferentially and projecting radially inward into the cut-out 18, which can be best seen from FIG. 15. On a compressor-side end area of the bearing outer ring 4 following the groove 10 there are four reliefs 37 arranged offset relative to each other circumferentially corresponding to the ridges 36.

Figure 10:
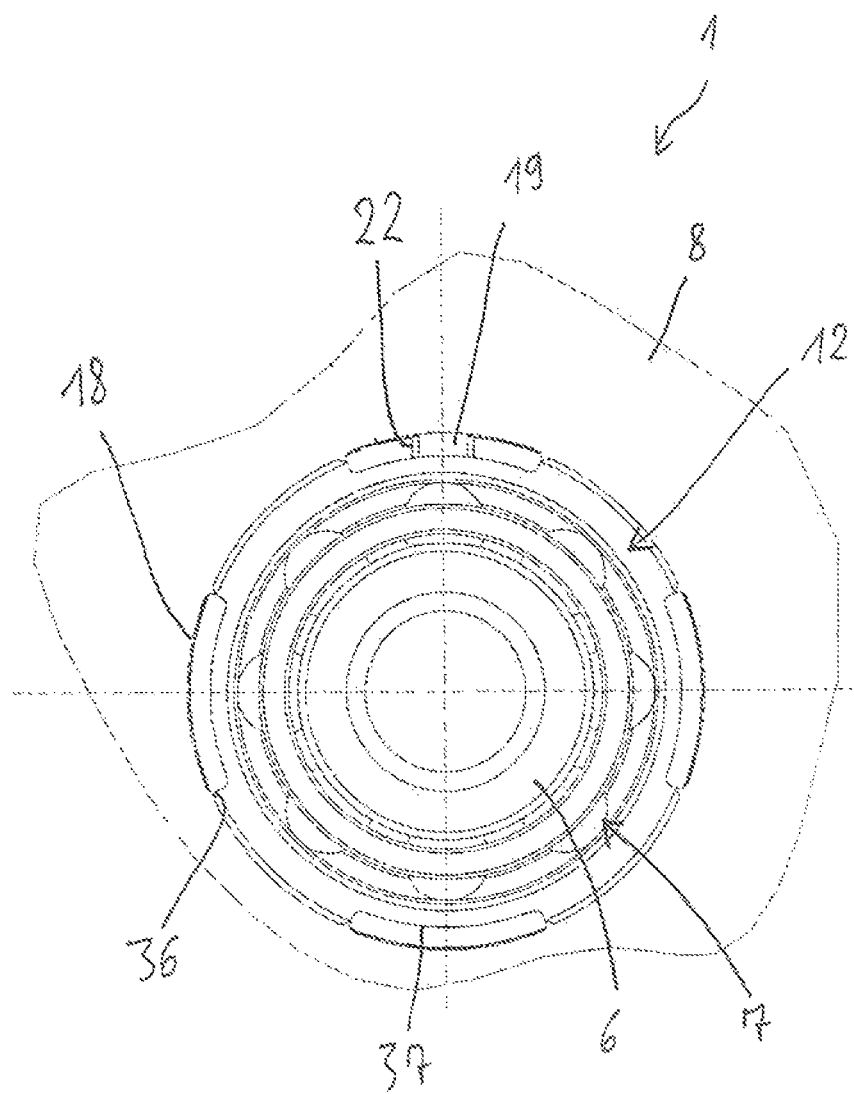

FIG. 10 shows a schematic end view of the bearing arrangement 1 shown in FIG. 9. The reliefs 37 are arranged essentially congruent to the ridges 36 lying behind.

FIG. 11 shows a schematic representation of a cross section of the bearing arrangement 1 shown in FIG. 9 corresponding to the section plane III-III from FIG. 9, that is, in the area of groove 10 of the compressor-side outer ring part 12.

FIG. 12 shows a schematic representation of another cross section of the bearing arrangement 1 shown in FIG. 9 corresponding to the section plane IV-IV from FIG. 9, that is, in the area of the anti-rotation element 19. The section 33 of the anti-rotation element 19 engages radially in the recess 20 of the bearing outer ring 4 that is formed by the relief 21 on the turbine-side outer ring part 13 and the recess 22 on the compressor-side outer ring part 12.

Figure 13:
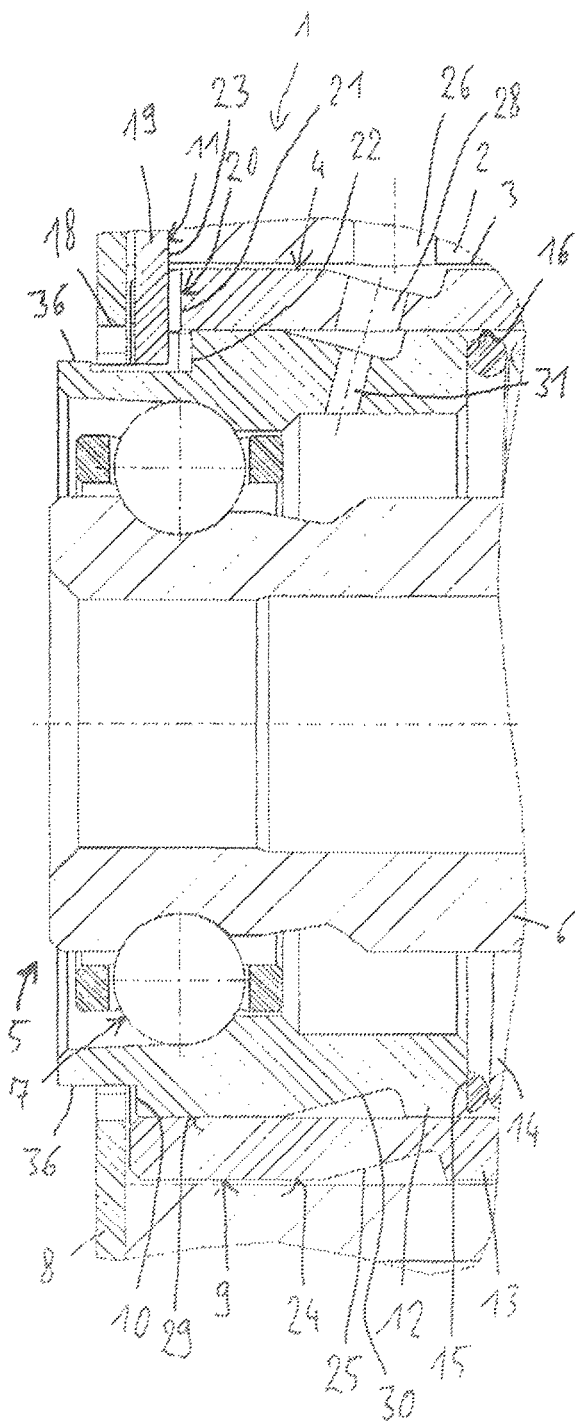

FIG. 13 shows a schematic detail representation of the bearing arrangement 1 shown in FIG. 9. The compressor-side structure of the bearing arrangement 1 can be seen better here.

Figure 14:
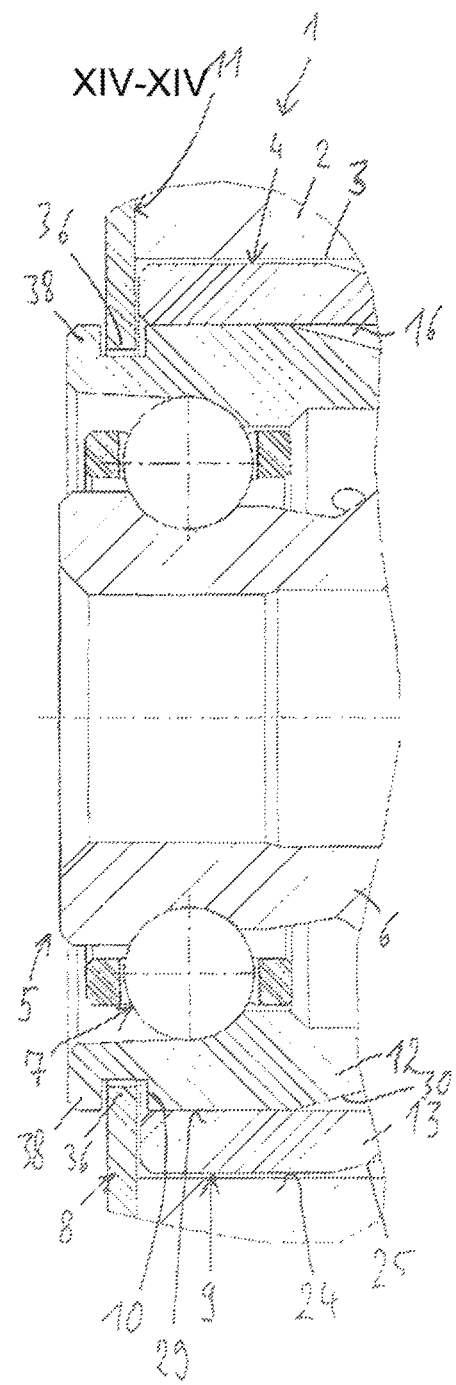

FIG. 14 shows another schematic detail representation of the bearing arrangement shown in FIG. 9 corresponding to the section plane XIV-XIV shown in FIG. 11. It can be seen how the ridges 36 are arranged in the groove 10 and engage behind ridges 38 arranged between the reliefs 37 of the compressor-side outer ring part 12 and pointing radially outward.

Figure 15:
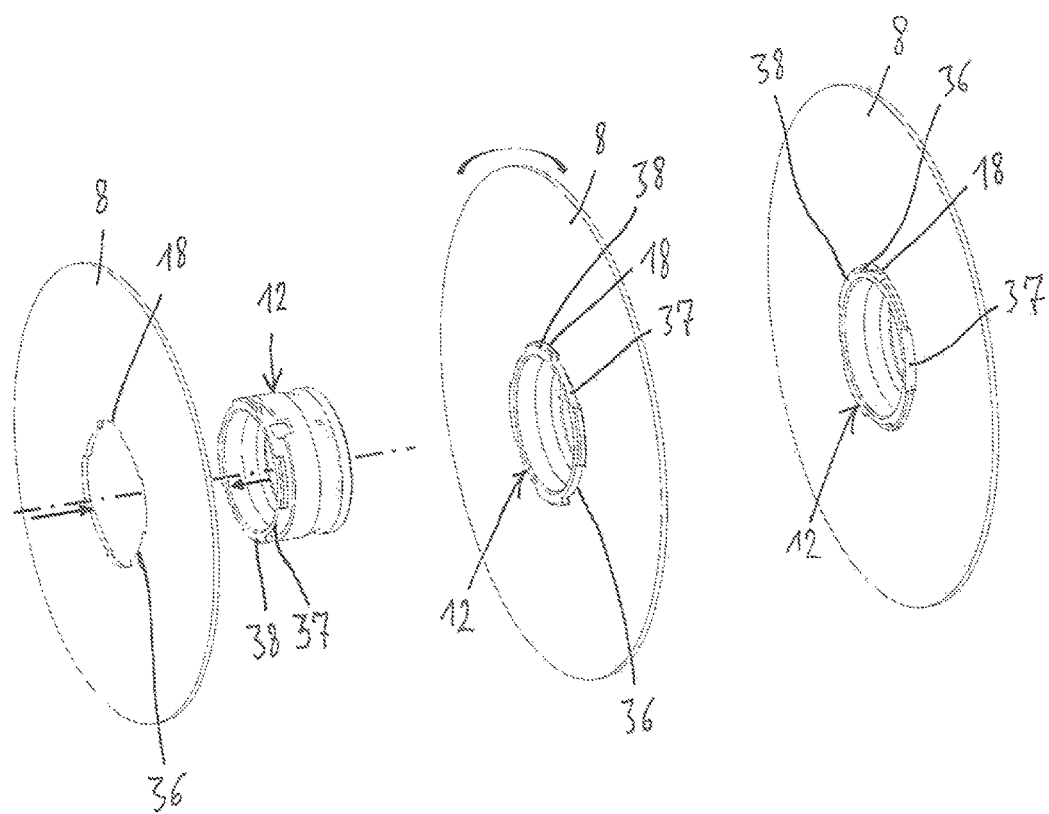

FIG. 15 shows a schematic and perspective representation of three successive assembly states of the bearing arrangement 1 shown in FIG. 9. In the left part of FIG. 15, the securing element 8 is not yet connected to the compressor-side outer ring part 12. To produce a connection, the securing element 8 and the compressor-side outer ring part 12 are guided axially relative to each other corresponding to the arrows until the installation position shown in the middle of FIG. 15 is reached. Here, the ridges 36 of the securing element 8 are moved through the reliefs 37 on the compressor-side outer ring part 12, so that the ridges 36 reach into the groove 10. Then the securing element 8 is rotated corresponding to the arrow in the clockwise direction relative to the compressor-side outer ring part 12 until the installation position shown at the right in FIG. 15 is reached in which the ridges 36 of the securing element 8 engage behind the ridges 38 of the compressor-side outer ring part 12.

Figure 16:
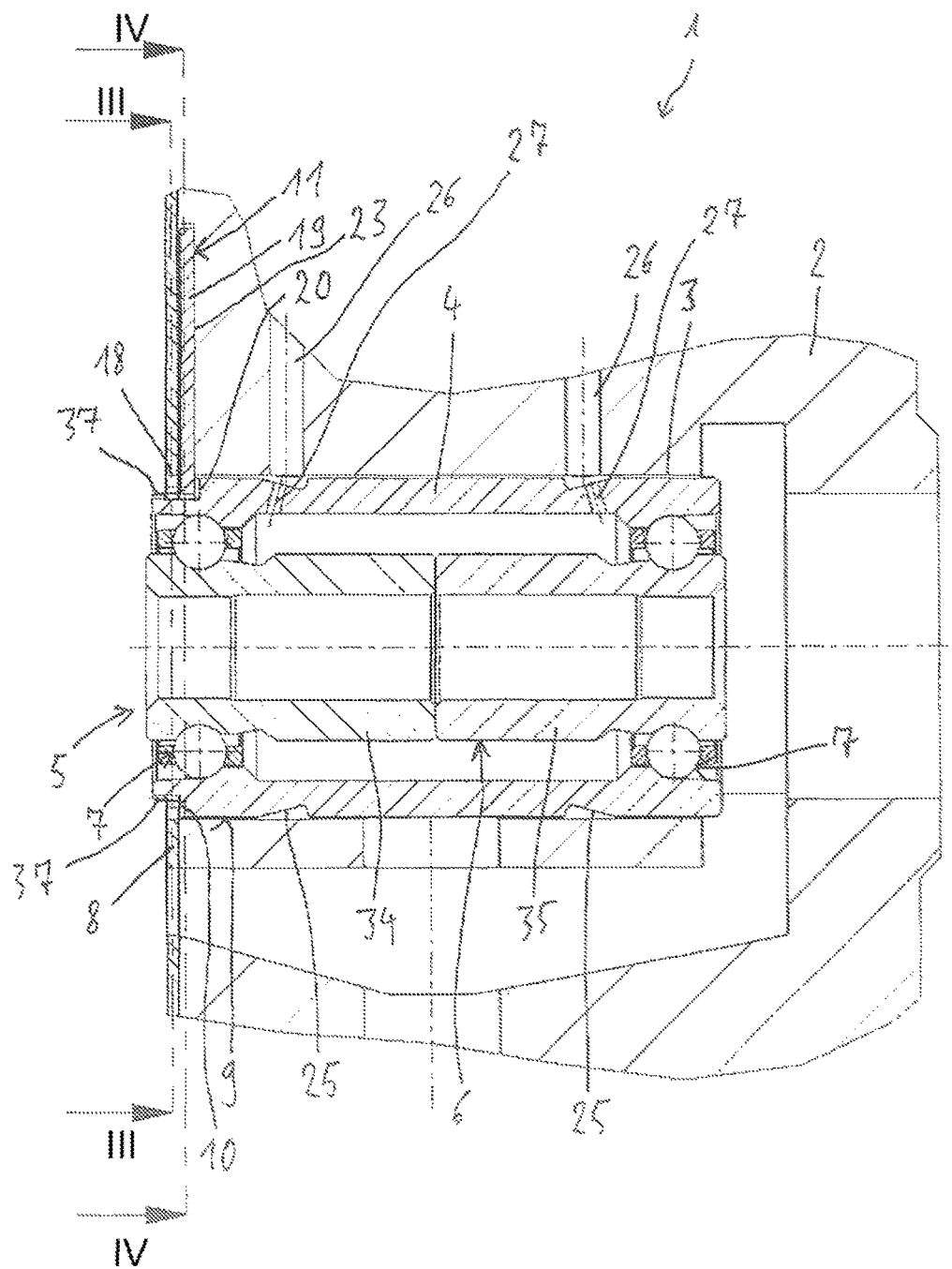

FIG. 16 shows a schematic representation of a longitudinal section of an embodiment for a bearing arrangement 1 that is not part of the invention. Below, only the differences with respect to the embodiment shown in FIG. 9 will be explained. With respect to the common features between the embodiments, refer to the statements concerning FIG. 9.

The essential difference between the embodiment shown in FIGS. 9 to 15 and the embodiment shown in FIG. 16 is that the bearing outer ring 4 is constructed in one part, while the bearing inner ring 6 is constructed in two parts and has two inner ring parts 34 and 35 and that there is no compression spring 14. On the bearing outer ring 4 there are two complete spray oil holes 27 that are each connected in a fluid-communicating way to one of the grooves 25 arranged on the outer lateral surface 9 of the bearing outer ring 4. Incidentally, the embodiment shown in FIG. 16 matches the embodiment shown in FIGS. 9 to 15.

Figure 17:
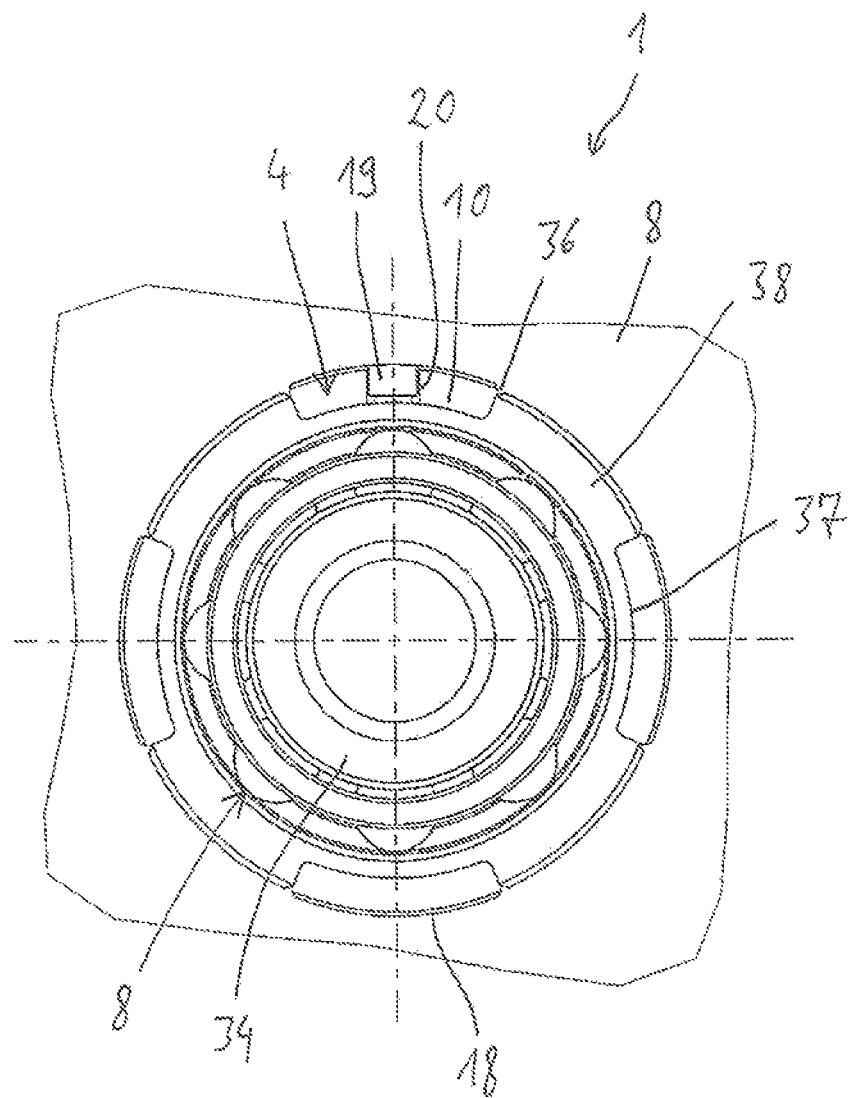

FIG. 17 shows a schematic end view of the bearing arrangement 1 shown in FIG. 16. The compressor-side structure of the bearing arrangement 1 can be seen better here.

Figure 18:
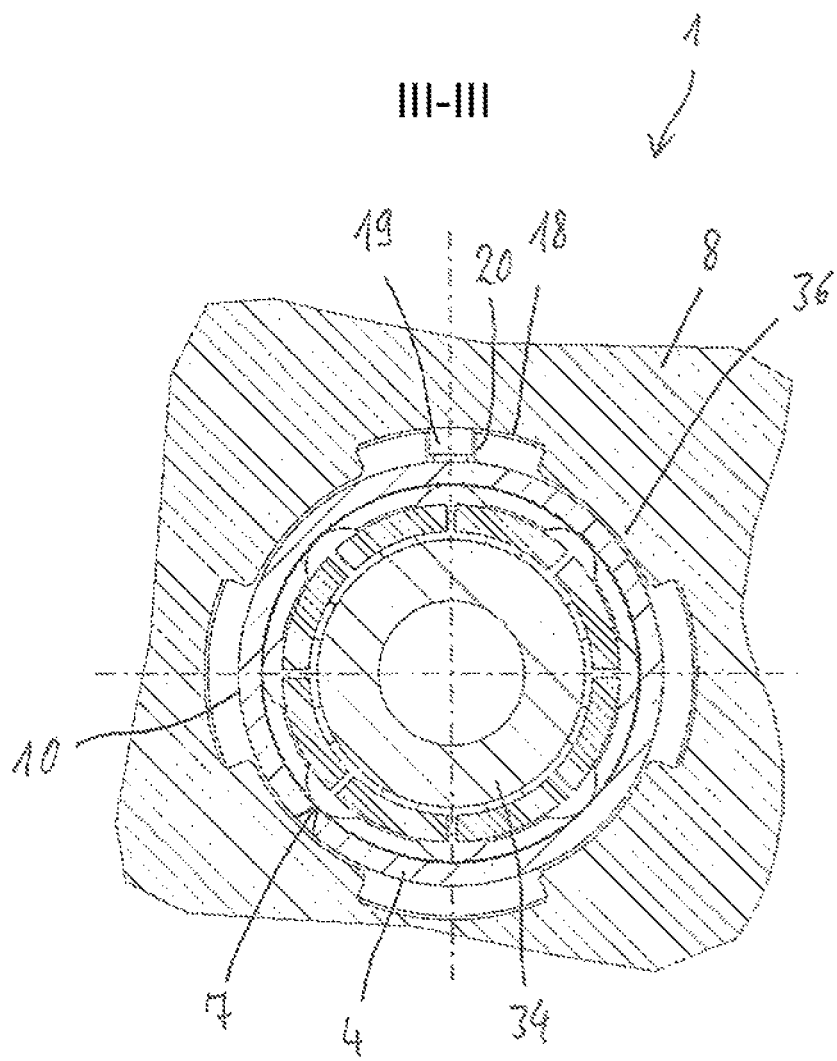

FIG. 18 shows a schematic representation of a cross section of the bearing arrangement 1 shown in FIG. 16 corresponding to the section plane III-III shown in FIG. 16, that is, in the area of the groove 10 of the bearing outer ring 4.

Figure 19:
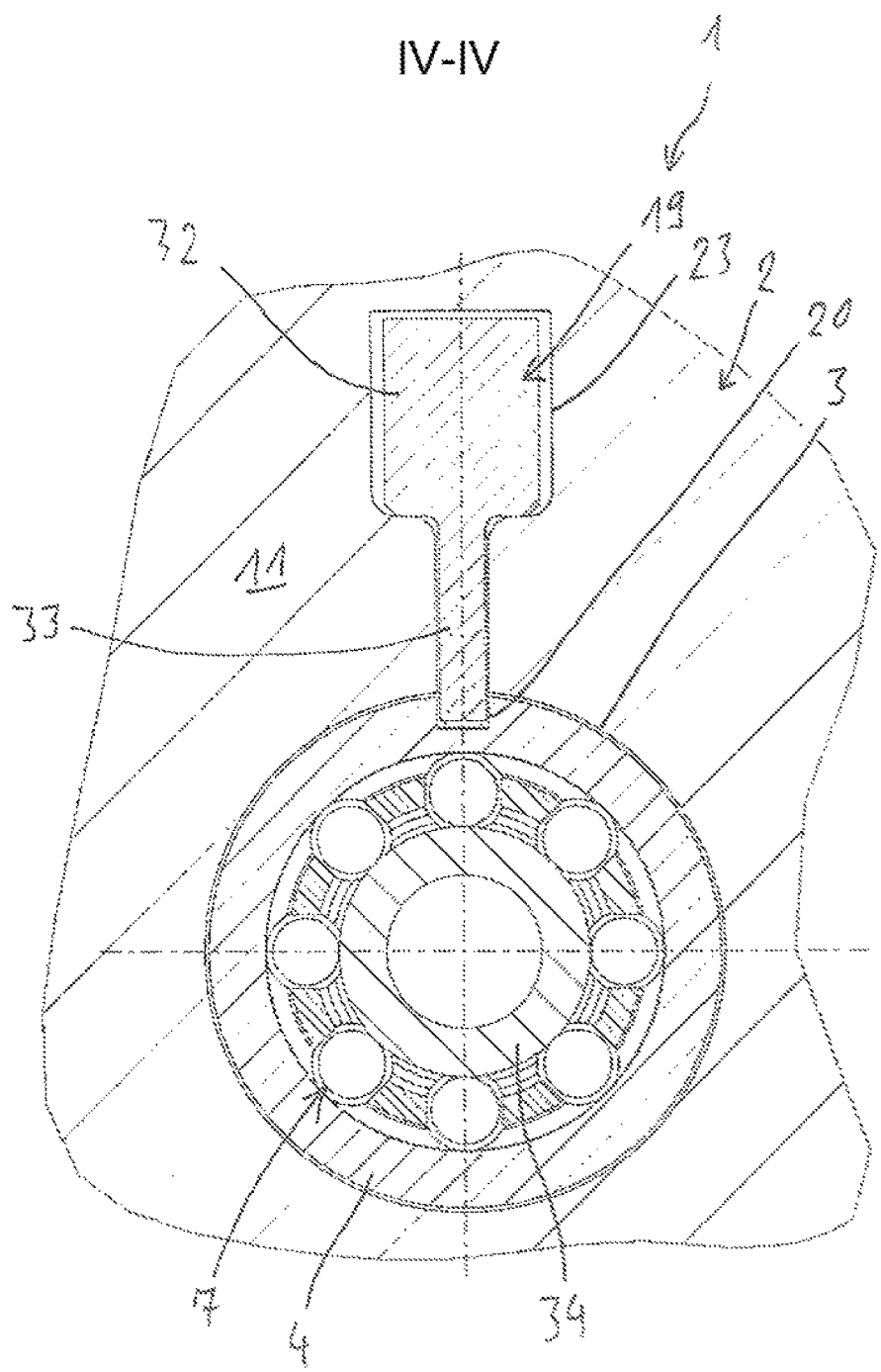

FIG. 19 shows a schematic representation of another cross section of the bearing arrangement 1 shown in FIG. 16 corresponding to the section plane IV-IV shown in FIG. 16, that is, in the area of the anti-rotation element 19.

Figure 20:
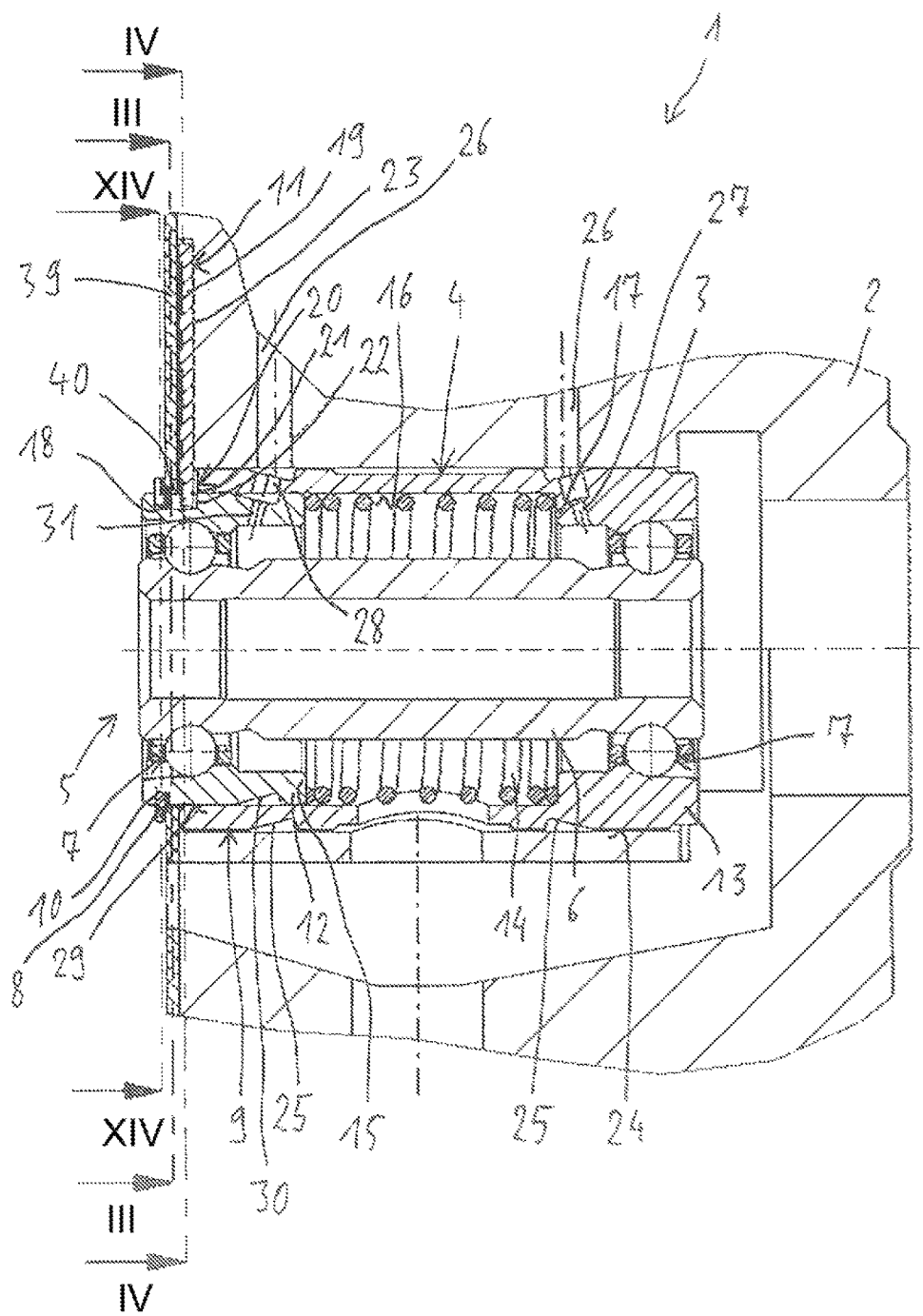

FIG. 20 shows a schematic representation of a longitudinal section of another embodiment for a bearing arrangement 1 according to the invention. Below, only the differences to the embodiment shown in FIG. 1 will be explained. With respect to the common features between the embodiments, refer to the statements concerning FIGS. 1 to 4.

The securing element 8 is constructed as a securing ring, wherein the securing ring is supported by a securing plate 39 constructed in one part indirectly on the compressor-side end 11 of the bearing housing 2 and the securing plate 39 is connected by the securing ring to the bearing outer ring 4 or the compressor-side outer ring part 12. The securing plate 39 has a cut-out 40 through which the compressor-side outer ring part 12 is guided.

Figure 21:
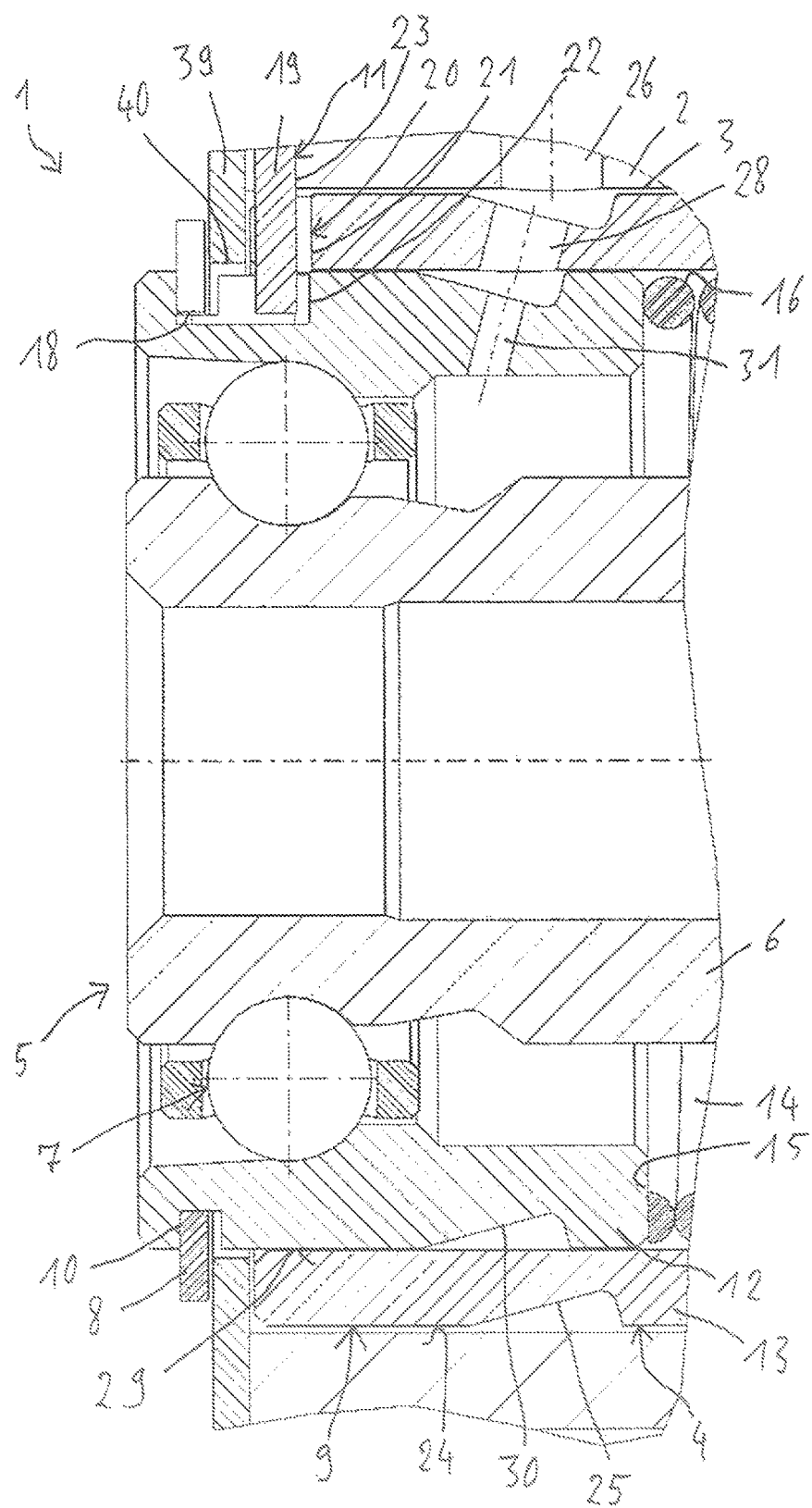

FIG. 21 shows a schematic detail representation of the bearing arrangement 1 shown in FIG. 20. The compressor-side structure of the bearing arrangement 1 can be seen better here.

FIG. 22 shows a schematic end view of the bearing arrangement 1 shown in FIG. 20.

FIG. 23 shows a schematic representation of a cross section of the bearing arrangement 1 shown in FIG. 20 corresponding to the section plane XIV-XIV shown in FIG. 20, that is, in the area of the groove 10 arranged on the compressor-side outer ring part 12.

Figure 24:
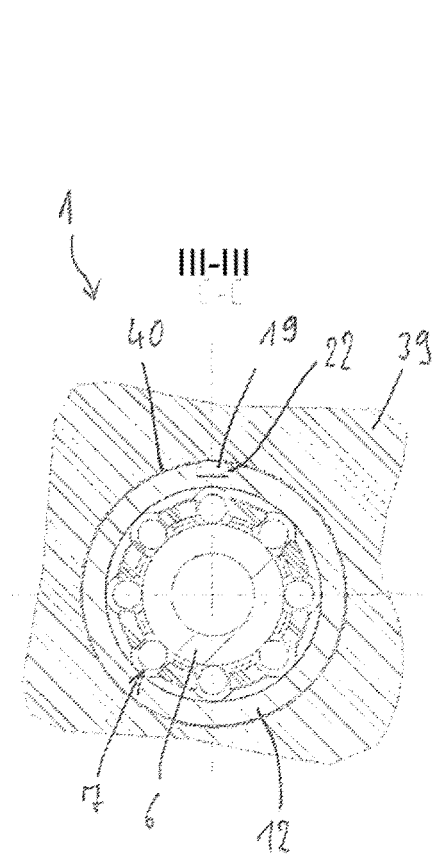

FIG. 24 shows a schematic representation of another cross section of the bearing arrangement 1 shown in FIG. 20 corresponding to the section plane III-III shown in FIG. 20, that is, in the area of the securing plate 39.

Figure 25:
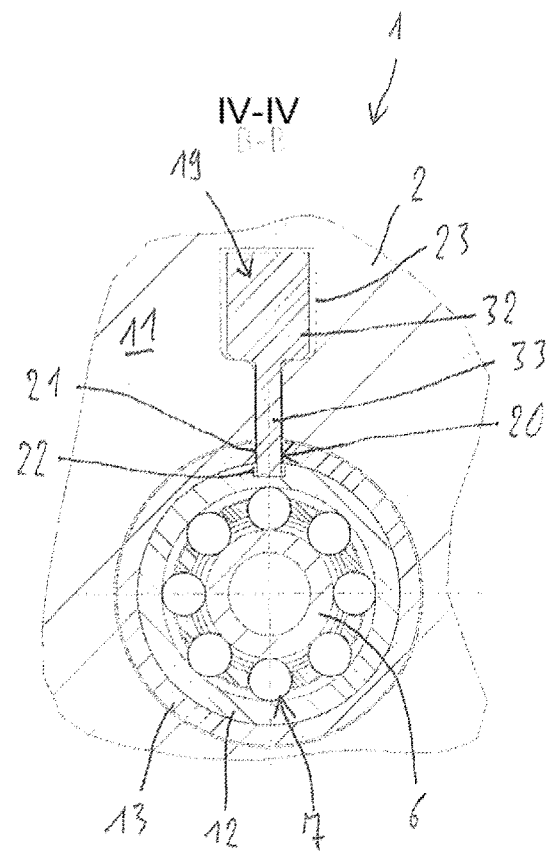

FIG. 25 shows a schematic representation of another cross section of the bearing arrangement 1 shown in FIG. 20 corresponding to the section plane IV-IV shown in FIG. 20, that is, in the area of the anti-rotation element 19.

Figure 26:
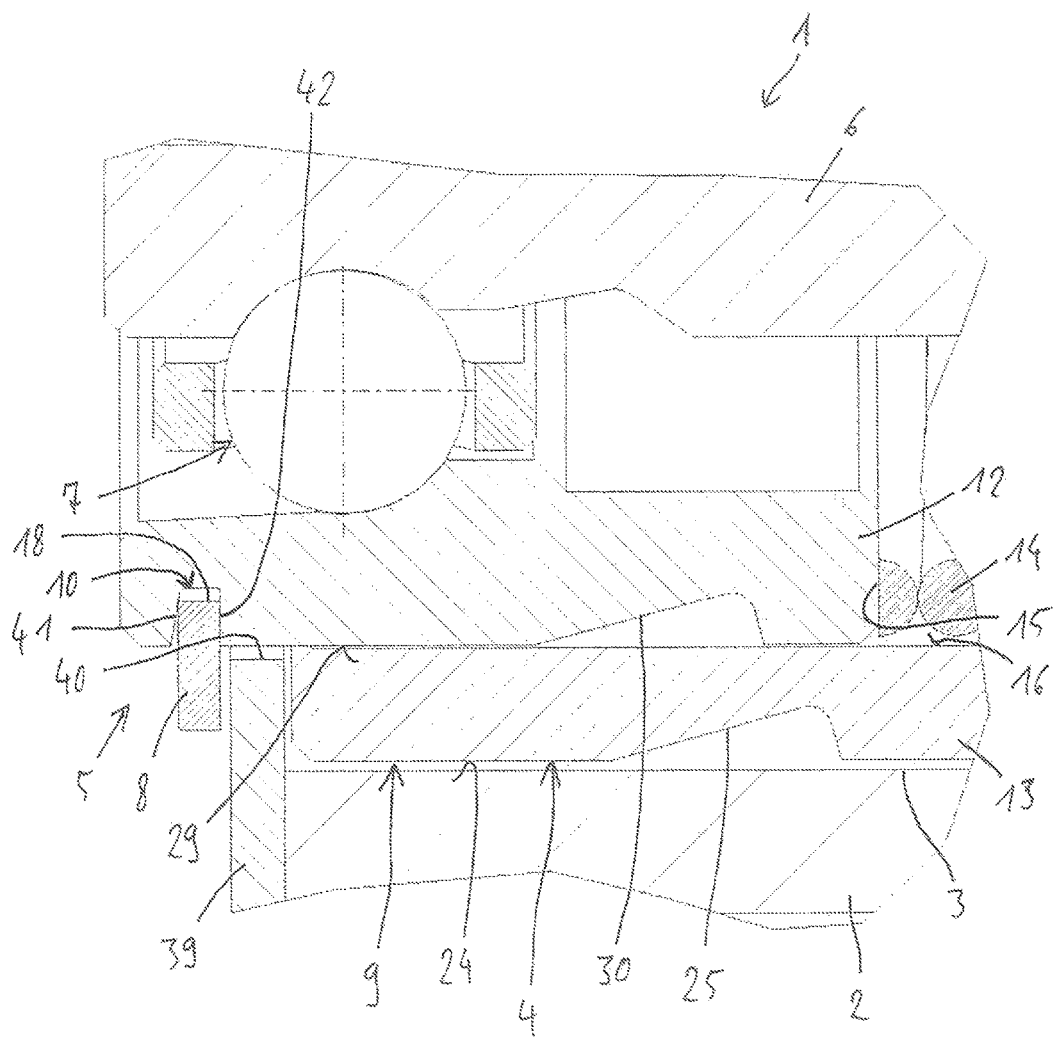

FIG. 26 shows a schematic detail representation of a longitudinal section of another embodiment for a bearing arrangement 1 according to the invention. This embodiment differs from the embodiment shown in FIGS. 20 to 26 in that a compressor-side side wall 41 of the groove 10 forms a cone tapering in the direction of a turbine-side side wall 42 of the groove 10.

LIST OF REFERENCE NUMBERS

1 Bearing arrangement
2 Bearing housing
3 Bearing hole
4 Bearing outer ring
5 Radial bearing
6 Bearing inner ring
7 Roller body row
8 Securing element
9 Outer lateral surface
10 Groove
11 Compressor-side end
12 Compressor-side outer ring part
13 Turbine-side outer ring part
14 Compression spring
15 Turbine-side end
16 Inner lateral surface
17 Projection
18 Cut-out
19 Anti-rotation element
20 Recess
21 Relief
22 Recess
23 Relief
24 Outer lateral surface
25 Groove
26 Oil supply hole
27 Spray oil hole
28 Spray oil hole section
29 Outer lateral surface
30 Groove
31 Spray oil hole section
32 Section
33 Section
34 Compressor-side inner ring part
35 Turbine-side inner ring part
36 Ridge
37 Relief
38 Ridge
39 Securing plate
40 Cutout
41 Compressor-side side wall
42 Turbine-side side wall

The invention claimed is:

1. A bearing arrangement for an exhaust gas turbocharger for rotating support of a rotor on a bearing housing, comprising
at least one bearing outer ring of a radial bearing, said at least one outer bearing ring being constructed in two parts and placed in a bearing hole of the bearing housing,
at least one securing element constructed at least in one part that fixes the bearing outer ring axially relative to the bearing housing, at least one groove arranged on an outer lateral surface of a compressor-side end section of the bearing outer ring in which the securing element engages, wherein the securing element is arranged on a compressor side outside of the bearing hole and is supported at least indirectly on a compressor-side end of the bearing housing, the two parts of the bearing outer ring comprise a compressor-side outer ring part and a turbine-side outer ring part, the compressor-side end section of the bearing outer ring is arranged on the compressor-side outer ring part, and the outer ring parts are guided for axial movement relative to each other and are pretensioned by at least one intermediate compression spring in axially opposite directions, and wherein the securing element is constructed with at least one cut-out, the securing element has at least two ridges arranged offset relative to each other circumferentially and projecting radially inward into the cut-out, and at least two reliefs arranged offset relative to each other circumferentially corresponding to the ridges are provided on a compressor-side end area of the bearing outer ring following the groove.

2. The bearing arrangement according to claim 1, wherein the compression spring is supported on one side on a turbine-side end of the compressor-side outer ring part and on another side on at least one projection arranged on an inner lateral surface of the turbine-side outer ring part and pointing radially inward, the projection is constructed by a surrounding radial step on the inner lateral surface of the turbine-side outer ring part.

3. The bearing arrangement according to claim 1, further comprising at least one anti-rotation element that secures the bearing outer ring against rotation relative to the bearing housing, and the anti-rotation element engages in at least one recess formed on the bearing outer ring.

4. The bearing arrangement according to claim 3, wherein the anti-rotation element is mounted on a compressor-side end of the bearing housing, a relief is arranged on the compressor-side end of the bearing housing in which a section of the anti-rotation element is enclosed, and the anti-rotation element is mounted by at least one of the securing element or a separating attachment on the compressor-side end of the bearing housing.

5. The bearing arrangement according to claim 1, wherein the securing element is constructed as a plate in at least two parts with at least one cut-out, a radial extent of the plate is larger than a diameter of the bearing hole and a diameter of the cut-out is smaller than an outer diameter of the compressor-side end section of the bearing outer ring.

6. The bearing arrangement according to claim 1, wherein the securing element is constructed as a one-part plate, a radial extent of the plate is greater than a diameter of the bearing hole, a diameter of the cut-out is greater than an outer diameter of the compressor-side end section of the bearing outer ring.

7. The bearing arrangement according to claim 1, wherein the securing element is constructed as a securing ring, the securing ring is supported by a securing plate constructed in one part indirectly on a compressor-side end of the bearing housing and the securing plate is connected by the securing ring to the bearing outer ring.

8. The bearing arrangement according to claim 1, wherein a compressor-side side wall of the groove forms a cone tapering in a direction of a turbine-side side wall of the groove.

9. An exhaust gas turbocharger comprising at least one bearing arrangement according to claim 1.

10. The bearing arrangement according to claim 1, wherein the bearing arrangement comprises only a single securing element.

11. A bearing arrangement for an exhaust gas turbocharger for rotating support of a rotor on a bearing housing, comprising at least one bearing outer ring of a radial bearing, for placement in a bearing hole of the bearing housing, said at least one outer bearing ring being constructed in two parts, the two parts being a compressor-side outer ring part and a turbine-side outer ring part, at least one groove arranged on an outer lateral surface of a compressor-side end section of the bearing outer ring, at least one recess formed on the bearing outer ring, the recess formed by both a relief on the turbine-side outer ring part and a recess on the compressor-side outer ring part;

at least one securing element that engages in the at least one groove of the bearing outer ring, the securing element constructed at least in one of the two parts that fixes the bearing outer ring axially relative to the bearing housing, wherein the securing element is arranged on a compressor side outside of the bearing hole and is supported at least indirectly on a compressor-side end of the bearing housing; and at least one anti-rotation element that secures the bearing outer ring against rotation relative to the bearing housing, and the anti-rotation element engages in the at least one recess formed on the bearing outer ring;

wherein the outer ring parts are guided for axial movement relative to each other and are pretensioned by at least one intermediate compression spring in axially opposite directions.

12. The bearing arrangement according to claim 11, wherein the anti-rotation element is mounted by at least one of the securing element or a separating attachment on the compressor-side end of the bearing housing.

13. The bearing arrangement according to claim 11, wherein the anti-rotation element projects radially inwardly from the bearing housing to the recess.

* * * * *